US012439134B1

(12) United States Patent
Barge et al.

(10) Patent No.: US 12,439,134 B1
(45) Date of Patent: Oct. 7, 2025

(54) SYNCHRONIZING LIVE AND PRE-RECORDED CONTENT OF MEDIA PROGRAMS

(71) Applicant: Amazon Technologies, Inc., Seattle, WA (US)

(72) Inventors: Charlotte Barge, Atlanta, GA (US); John Robert Ciancutti, Portola Valley, CA (US); Pratik GuhaRay, Kenmore, WA (US); Rakshit Karnawat, Seattle, WA (US); Sanjeev Kumar, Brookhaven, GA (US); Michael Klingbeil, North Haven, CT (US); Madhuri R. Marri, Cumming, GA (US); Puneet K Puri, San Jose, CA (US); Steven Sabonjohn, Los Angeles, CA (US); Hiten Vasnani, Los Angeles, CA (US); Ankit Kumar Yadav, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 668 days.

(21) Appl. No.: 17/835,381

(22) Filed: Jun. 8, 2022

(51) Int. Cl.
*H04N 21/8547* (2011.01)
*H04N 21/242* (2011.01)
(Continued)

(52) U.S. Cl.
CPC ....... *H04N 21/8547* (2013.01); *H04N 21/242* (2013.01); *H04N 21/43072* (2020.08); *H04N 21/435* (2013.01)

(58) Field of Classification Search
CPC . H04L 65/611; H04L 67/1074; H04L 65/765; H04N 21/4382; H04N 21/632;
(Continued)

(56) References Cited

U.S. PATENT DOCUMENTS 5,832,435 A 11/1998 Silverman
8,023,800 B2 9/2011 Concotelli
(Continued)

FOREIGN PATENT DOCUMENTS

AU 2013204532 B2 11/2014
CA 2977959 A1 9/2016
(Continued)

OTHER PUBLICATIONS

Hoegen, Rens, et al. "An End-to-End Conversational Style Matching Agent." Proceedings of the 19th ACM International Conference on Intelligent Virtual Agents. 2019, pp. 1-8. (Year: 2019).
(Continued)

*Primary Examiner* — Vinncelas Louis
(74) *Attorney, Agent, or Firm* — Athorus, PLLC

(57) ABSTRACT

A synchronization system or module controls the transmission of voice or music (or other media) during a media program, consistent with a state of the media program. When a media program is in a voice state, a creator of a media program may speak or sing words that are captured and transmitted to devices of listeners. When the media program is in a media state, the creator may instruct or command that a media entity that has been pre-buffered on the devices of the listeners may be played to such listeners. A synchronization system or module that interprets instructions or commands of a creator or interprets interactions of a creator of the media program may likewise instruct or command devices of the listeners to play voice or media, in a synchronized manner.

20 Claims, 16 Drawing Sheets

(51) Int. Cl.
*H04N 21/43* (2011.01)
*H04N 21/435* (2011.01)

(58) Field of Classification Search
CPC .... H04N 7/15; H04N 21/8547; H04N 21/242; H04N 21/43072; H04N 21/435
See application file for complete search history.

(56) References Cited

U.S. PATENT DOCUMENTS

| | | |
|---|---|---|
| 8,112,720 B2 | 2/2012 | Curtis |
| 8,560,683 B2 | 10/2013 | Funk et al. |
| 8,572,243 B2 | 10/2013 | Funk et al. |
| 8,768,782 B1 | 7/2014 | Myslinski |
| 8,850,301 B1 | 9/2014 | Rose |
| 9,001,178 B1* | 4/2015 | Leske ............... H04L 65/765 |
| | | 348/14.08 |
| 9,003,032 B2 | 4/2015 | Funk et al. |
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,015,589 B1 | 7/2018 | Ebenezer |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,422 B1 | 1/2019 | Panchaksharaiah et al. |
| 10,178,442 B2 | 1/2019 | Shkedi |
| 10,264,213 B1 | 4/2019 | Sculley |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,700,648 B2 | 6/2020 | Lesso |
| 10,719,837 B2 | 7/2020 | Kolowich et al. |
| 10,769,678 B2 | 9/2020 | Li |
| 10,846,330 B2 | 11/2020 | Shilo |
| 10,893,329 B1 | 1/2021 | Trim et al. |
| 10,985,853 B2 | 4/2021 | Bretherton |
| 10,986,064 B2 | 4/2021 | Siegel et al. |
| 10,997,240 B1 | 5/2021 | Aschner et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,539,845 B1 | 12/2022 | Fowers et al. |
| 11,580,982 B1 | 2/2023 | Karnawat et al. |
| 11,586,344 B1 | 2/2023 | Balagurunathan et al. |
| 11,605,387 B1 | 3/2023 | Muralitharan et al. |
| 11,900,902 B2 | 2/2024 | Martinez Ramirez et al. |
| 11,916,981 B1 | 2/2024 | Karnawat et al. |
| 2002/0042920 A1 | 4/2002 | Thomas et al. |
| 2002/0056087 A1 | 5/2002 | Berezowski et al. |
| 2003/0117486 A1 | 6/2003 | Ferren et al. |
| 2004/0057586 A1 | 3/2004 | Licht |
| 2005/0201360 A1 | 9/2005 | Redstone |
| 2005/0213726 A1 | 9/2005 | Rodman |
| 2005/0213734 A1 | 9/2005 | Rodman |
| 2005/0213735 A1 | 9/2005 | Rodman et al. |
| 2006/0018457 A1 | 1/2006 | Unno et al. |
| 2006/0018458 A1 | 1/2006 | McCree et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2008/0201424 A1* | 8/2008 | Darcie ............... H04N 7/15 |
| | | 709/204 |
| 2009/0044217 A1 | 2/2009 | Lutterbach et al. |
| 2009/0076917 A1 | 3/2009 | Jablokov et al. |
| 2009/0100098 A1 | 4/2009 | Feher et al. |
| 2009/0254934 A1 | 10/2009 | Grammens |
| 2009/0298417 A1 | 12/2009 | Phillips |
| 2010/0088187 A1 | 4/2010 | Courtney et al. |
| 2010/0280641 A1 | 11/2010 | Harkness et al. |
| 2011/0063406 A1 | 3/2011 | Albert et al. |
| 2011/0067044 A1 | 3/2011 | Albo |
| 2011/0267419 A1 | 11/2011 | Quinn et al. |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311444 A1 | 12/2012 | Chaudhri |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1 | 1/2014 | Guminy et al. |
| 2014/0040494 A1 | 2/2014 | Deinhard et al. |
| 2014/0068432 A1 | 3/2014 | Kucharz et al. |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0095014 A1 | 4/2015 | Marimuthu |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0254056 A1* | 9/2015 | Walker ............... H04L 67/1074 |
| | | 715/716 |
| 2015/0289021 A1 | 10/2015 | Miles |
| 2015/0319472 A1 | 11/2015 | Kotecha et al. |
| 2015/0326922 A1 | 11/2015 | Givon et al. |
| 2016/0027196 A1 | 1/2016 | Schiffer et al. |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0224311 A1* | 8/2016 | Touch ............... H04L 65/611 |
| 2016/0266781 A1 | 9/2016 | Dandu et al. |
| 2016/0291926 A1 | 10/2016 | Hundemer |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0193531 A1 | 7/2017 | Fatourechi et al. |
| 2017/0213248 A1 | 7/2017 | Jing et al. |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0061393 A1 | 3/2018 | Osotio |
| 2018/0184213 A1 | 6/2018 | Lesimple et al. |
| 2018/0205797 A1 | 7/2018 | Faulkner |
| 2018/0227632 A1 | 8/2018 | Rubin et al. |
| 2018/0255114 A1 | 9/2018 | Dharmaji |
| 2018/0293221 A1 | 10/2018 | Finkelstein et al. |
| 2018/0322411 A1 | 11/2018 | Wang et al. |
| 2018/0367229 A1 | 12/2018 | Gibson et al. |
| 2019/0052934 A1* | 2/2019 | Groves ............... H04N 21/632 |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Luke et al. |
| 2019/0273570 A1 | 9/2019 | Bretherton |
| 2019/0327103 A1 | 10/2019 | Niekrasz |
| 2019/0364359 A1 | 11/2019 | Ferguson et al. |
| 2019/0385600 A1 | 12/2019 | Kim |
| 2020/0021888 A1 | 1/2020 | Brandao et al. |
| 2020/0106885 A1 | 4/2020 | Koster et al. |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2020/0364727 A1 | 11/2020 | Scott-Green et al. |
| 2021/0090224 A1 | 3/2021 | Zhou et al. |
| 2021/0104245 A1 | 4/2021 | Alas et al. |

(56) References Cited

U.S. PATENT DOCUMENTS

| | | |
|---|---|---|
| 2021/0105149 A1 | 4/2021 | Roedel et al. |
| 2021/0125054 A1 | 4/2021 | Banik et al. |
| 2021/0160588 A1 | 5/2021 | Joseph et al. |
| 2021/0210102 A1 | 7/2021 | Huh et al. |
| 2021/0217413 A1 | 7/2021 | Tushinskiy et al. |
| 2021/0224319 A1 | 7/2021 | Ingel et al. |
| 2021/0232577 A1 | 7/2021 | Ogawa et al. |
| 2021/0256086 A1 | 8/2021 | Askarian et al. |
| 2021/0281925 A1 | 9/2021 | Shaikh et al. |
| 2021/0366462 A1 | 11/2021 | Yang et al. |
| 2021/0374391 A1 | 12/2021 | Jorasch et al. |
| 2021/0407520 A1 | 12/2021 | Neckermann et al. |
| 2022/0038783 A1 | 2/2022 | Wee |
| 2022/0038790 A1 | 2/2022 | Duan et al. |
| 2022/0159377 A1 | 5/2022 | Wilberding et al. |
| 2022/0223286 A1 | 7/2022 | Lach et al. |
| 2022/0230632 A1 | 7/2022 | Maitra et al. |
| 2022/0254348 A1 | 8/2022 | Tay et al. |
| 2022/0286748 A1 | 9/2022 | Dyer et al. |
| 2022/0369034 A1 | 11/2022 | Kumar et al. |
| 2022/0415327 A1 | 12/2022 | Fowers et al. |
| 2022/0417297 A1 | 12/2022 | Daga et al. |
| 2023/0036192 A1 | 2/2023 | Alakoye |
| 2023/0085683 A1 | 3/2023 | Turner |
| 2023/0217195 A1 | 7/2023 | Poltorak |
| 2024/0031489 A1 | 1/2024 | Lundin et al. |
| 2024/0289086 A1* | 8/2024 | Korb .................. H04N 21/4382 |

FOREIGN PATENT DOCUMENTS

| | | |
|---|---|---|
| CN | 104813305 A | 7/2015 |
| DE | 112020002288 | 2/2022 |
| KR | 20170079496 A | 7/2017 |
| WO | 2019089028 A1 | 5/2019 |

OTHER PUBLICATIONS

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

* cited by examiner

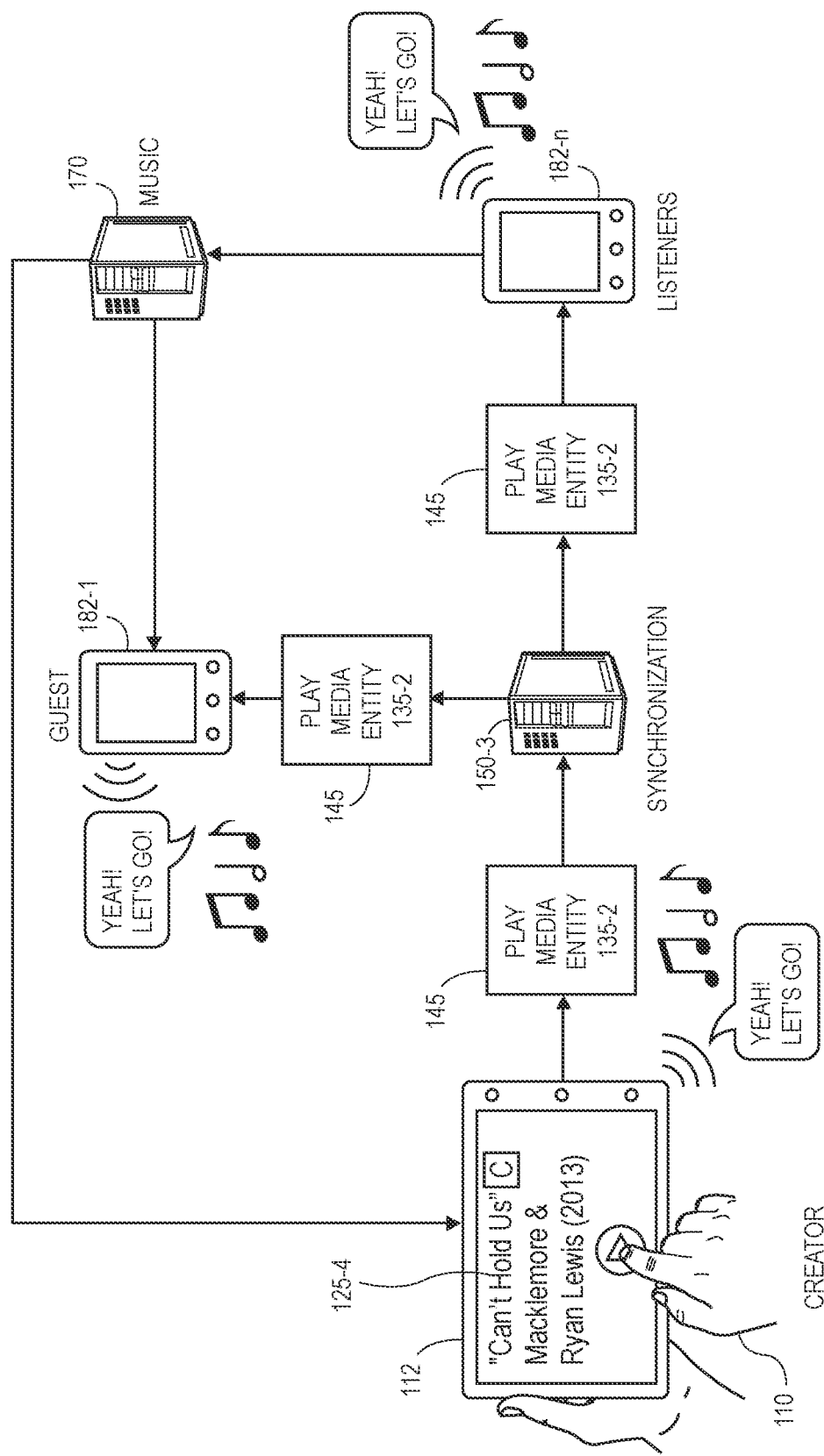

SYNCHRONIZING LIVE AND PRE-RECORDED CONTENT OF MEDIA PROGRAMS

BACKGROUND

Currently, the transmission of Internet-based media programs including media content of diverse type or forms that may be transmitted by and received from disparate sources is plagued by a number of limitations. For example, where a media program includes audio or video content, e.g., previously recorded music of any type or form, the audio or video content may be buffered or pre-buffered on devices of clients (e.g., viewers or listeners) of the media program, or made readily available via a content delivery network, to reduce or eliminate any delays or issues associated with brief disruptions in network connectivity, to ensure that the music is presented to the clients with a high sampling rate and in stereo, or with other sufficiently high measures of quality.

Where a media program includes live vocal sounds, such as voices including one or more sets of spoken or sung words uttered by a creator or any other participant in the media program (e.g., a host, an artist, an invited guest, or others), the vocal sounds may be optimized to account for low-bandwidth or sporadic network connectivity, since the quality or fidelity of voice is less essential to clients of media programs than the quality or fidelity of media such as music. Where voice-based feedback, text-based feedback, sentiments or other feedback is desired from clients (e.g., viewers or listeners), separate network connections or channels may be established or made available between devices of creators or other participants, or devices of listeners, and computer systems associated with the transmission of the media programs, to ensure that such feedback is appropriately received, processed and shared with creators or others. In order to ensure that the feedback is both timely and relevant, however, the transmission of voice and the transmission of music or other media content must be appropriately synchronized among all clients of a media program.

The challenges of optimizing for music, optimizing for interactivity and optimizing for latencies are difficult to resolve together by a common solution.

BRIEF DESCRIPTION OF THE DRAWINGS

FIGS. 1A through 1H are views of aspects of one system for synchronizing live and pre-recorded content of media programs in accordance with embodiments of the present disclosure.

DETAILED DESCRIPTION

As is set forth in greater detail below, the present disclosure is directed to systems and methods for synchronizing live media content (e.g., voices) and pre-recorded media content (e.g., music or other media entities) that is broadcast to systems or devices of one or more users, e.g., listeners, during a media program. In some implementations, a creator of a media program may identify or select one or more media entities (e.g., songs) that he or she intends or may potentially cause to be played by devices of listeners during a media program, and portions or all of such media entities may be pre-buffered on the devices of such listeners, as well as a device of the creator, and devices of any other participants. A synchronization system or module in communication with the device of the creator, the devices of any other participants, and the devices of the listeners may transmit instructions or commands regarding a state of a media program to each of such devices, in order to cause media content to be played by such devices in accordance with the state.

When a media program is in progress, the creator and any participants may speak, sing or otherwise utter any number of words that are captured by their respective devices. The synchronization system or module may determine that the media program is in a live state (or a voice state, or a live media state), and cause audio data representing the uttered words to be transmitted to devices of listeners via a conference system and/or a broadcast system. When the creator causes a selected media entity (e.g., a song or other pre-recorded media content) to be played during the media program, however, the synchronization system or module receives interactions or commands of the creator with one or more devices, and determines that the media program is in a pre-recorded state (or a music state, or a pre-recorded media state). The synchronization system or module then causes devices of each of the listeners to the media program to play pre-buffered content of the selected media entity. The synchronization system or module may thus cause data representing voices of the creator or the participants, and any media entities selected by the creator, to be presented to users at the control and discretion of the creator, and in a manner that ensures that each of such listeners enjoys a common, synchronized experience in listening to the media program.

Figure 1A:
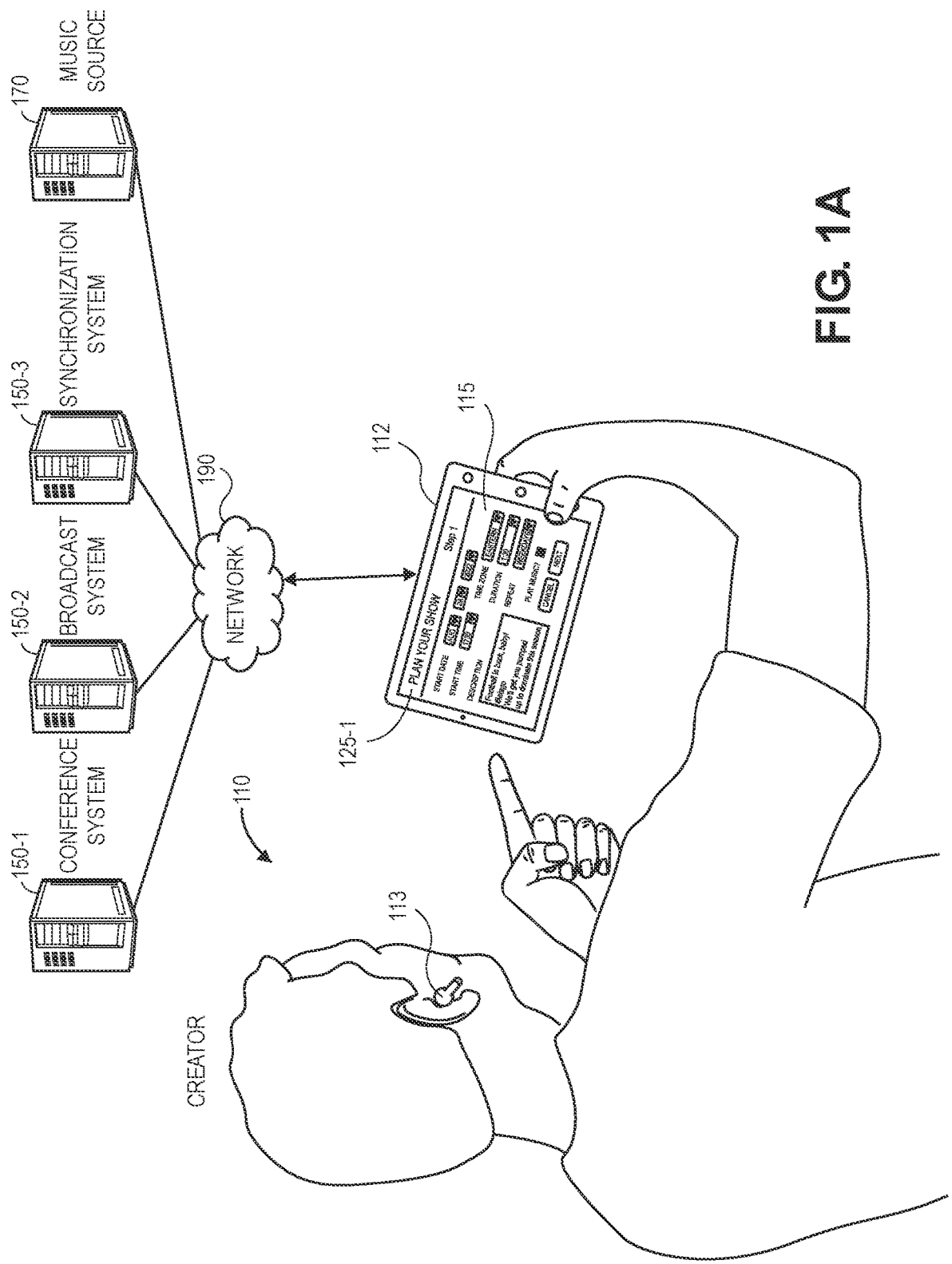

Referring to FIGS. 1A through 1H, views of aspects of one system for synchronizing live and pre-recorded content of media programs in accordance with embodiments of the present disclosure are shown. As is shown in FIG. 1A, a mobile device 112 (e.g., a smartphone, a tablet computer, a laptop computer, or any other system or device) of a creator 110 (e.g., a user), a conference system 150-1, a broadcast system 150-2, a synchronization system 150-3 and a music source 170 (e.g., one or more servers or other computer systems) are connected to one another over one or more networks 190, which may include the Internet in whole or in part.

As is further shown in FIG. 1A, the creator 110 wears one or more ear buds 113 (or earphones, or headphones) or other communication systems or devices which may be in communication with the mobile device 112, and may exchange (e.g., transfer or receive) data relating to audio signals or any other data with the mobile device 112. Additionally, each of the conference system 150-1, the broadcast system 150-2, the synchronization system 150-3 or the music source 170 may be a server or another computer device or system of any type or form. Such systems may be provided in a common location, or in one or more alternate or virtual locations, e.g., in a "cloud"-based environment.

As is shown in FIG. 1A, the mobile device 112 includes a display 115 (e.g., a touchscreen) having a user interface 125-1 rendered thereon. The user interface 125-1 may include one or more interactive or selectable elements or features enabling the creator 110 to provide any information regarding an upcoming media program, such as to identify any media entities that the creator 110 may potentially cause to be transmitted to devices of listeners during the media program, or any other elements or features. In some implementations, the display 115 may be a capacitive touchscreen, a resistive touchscreen, or any other system for receiving interactions by the creator 110. In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form.

Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown).

Figure 1B:
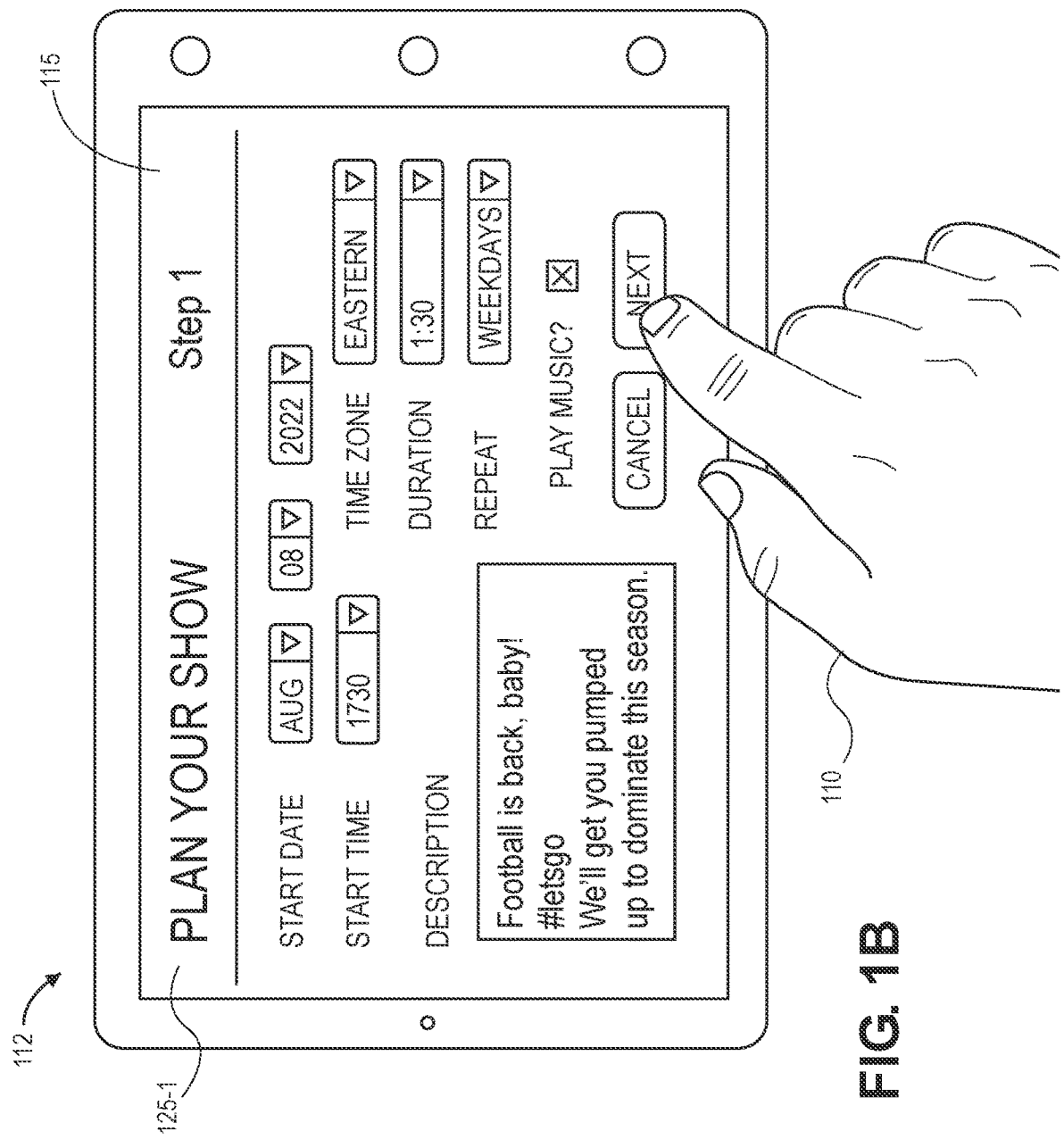

As is shown in FIG. 1B, the user interface 125-1 includes one or more interactive or selectable features that enable the creator 110 to define one or more attributes or parameters of a media program. For example, as is shown in FIG. 1B, the creator 110 may interact with one or more drop-down menus or other features on the user interface 125-1 to designate a start date (viz., Aug. 8, 2022) and a start time (viz., 17:30, or 5:30 p.m.) of the media program, as well as a time zone (viz., Eastern) in which the start time is to be determined. The creator 110 may further interact with one or more drop-down menus on the user interface 125-1 to designate a duration of the media program (viz., one hour and thirty minutes) and a period by which the program is to be repeated (viz., on weekdays). The creator 110 may also enter a text-based description of the media program, e.g., "Football is back, baby! #letsgo We'll get you pumped up to dominate this season," and provide an indication that he or she intends to play music during the media program. The creator 110 may further select one or more buttons or other features for confirming its designations or entries and advancing to another user interface.

Figure 1C:
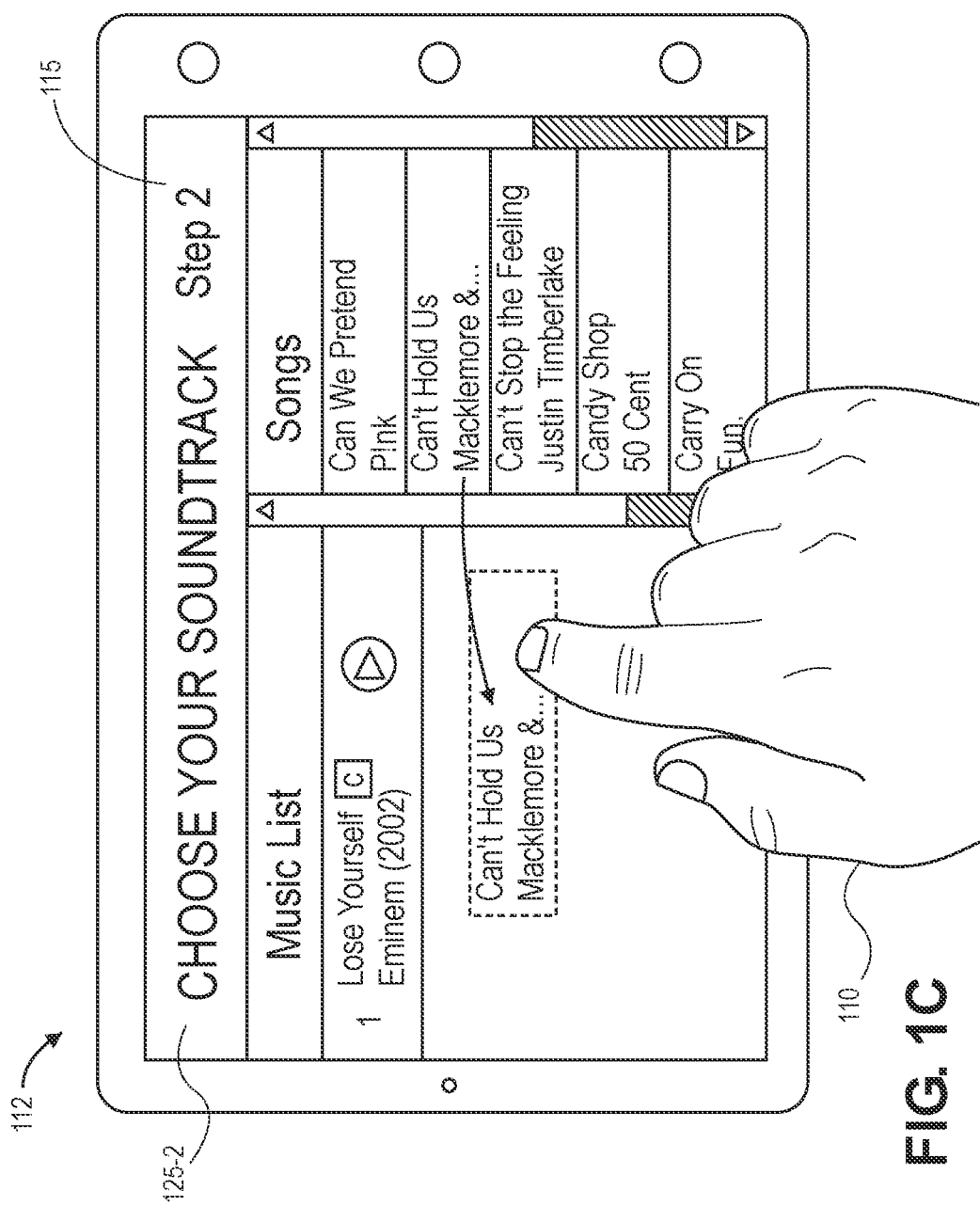

As is shown in FIG. 1C, a user interface 125-2 is rendered on the display 115 of the mobile device 112. The user interface 125-2 includes one or more interactive or selectable elements or features that, when activated by the creator 110, enable the creator 110 to identify or select one or more media entities (e.g., songs or other media content) to be played during a media program. For example, as is shown in FIG. 1C, the creator 110 may interact with a list or a set of elements or features corresponding to media entities (viz., "Songs") in one portion of the user interface 125-2, and place one or more of such elements or features on or within another portion of the user interface 125-2 (viz., "Music List"), e.g., by a drag-and-drop gesture or any other interaction, or in any other manner. Each of the elements or features may correspond to one or more songs or other media entities that the creator 110 may cause to be played during the media program at any given time. When an element or feature corresponding to a media entity is placed within the portion of the user interface 125-2, the element or feature may be modified to include one or more interactive features for providing additional attributes or parameters of the media content, which may be of any type or form (e.g., audio content or video content that may be generated live or previously recorded).

The elements or features may be placed in an order selected by the creator 110, and may identify media entities that the creator 110 intends to or believes that he or she may want to play during the media program. The identification or selection of media entities as shown in FIG. 1C is merely optional, and the identification or selection of the media entities need not obligate or require the creator 110 to play any of the media entities during the media program. Rather, the creator 110 may play any or all of the identified or selected media entities during the media program, or none of the identified or selected media entities. In some implementations, the creator 110 may play any number of media entities other than those that are identified or selected as shown in FIG. 1C.

Alternatively, or in addition to songs, the user interface 125-2 may include elements or features corresponding to media entities other than songs. For example, one or more of the elements or features may correspond to movies, podcasts, television shows, or other content, as well as descriptors of such content, e.g., eras, genres, moods or others. One or more of the elements or features may further correspond to files including information, data or metadata regarding sets of media content, or physical or virtual representations of sets of media content, such as albums, playlists, soundtracks, or others, and may further identify one or more persons or entities associated with media content, e.g., an artist, a group, a label, a producer, a service, a station, or any other persons or entities. Likewise, one or more of the elements or features may correspond to media content other than songs, e.g., advertisements (or promotional materials), sports-related media content captured prior to, during or after sporting events, e.g., highlights, commentary, interviews, pre-game predictions or post-game analyses, or others, as well as weather reports, or any other type or form of content.

In some implementations, one or more of the elements or features may permit the creator 110 to provide or specify a text-based description of a media entity, e.g., in one or more text boxes or in any other manner. One or more other elements or features may further permit the creator 110 to provide or specify a start time, an end time, or a duration of a playing of media content, e.g., with one or more drop-down menus or other features. Still other elements or features may enable the creator 110 to identify a media entity by an artist, an era, a genre, a mood, a playlist, a title, or another attribute or parameter.

Figure 1D:
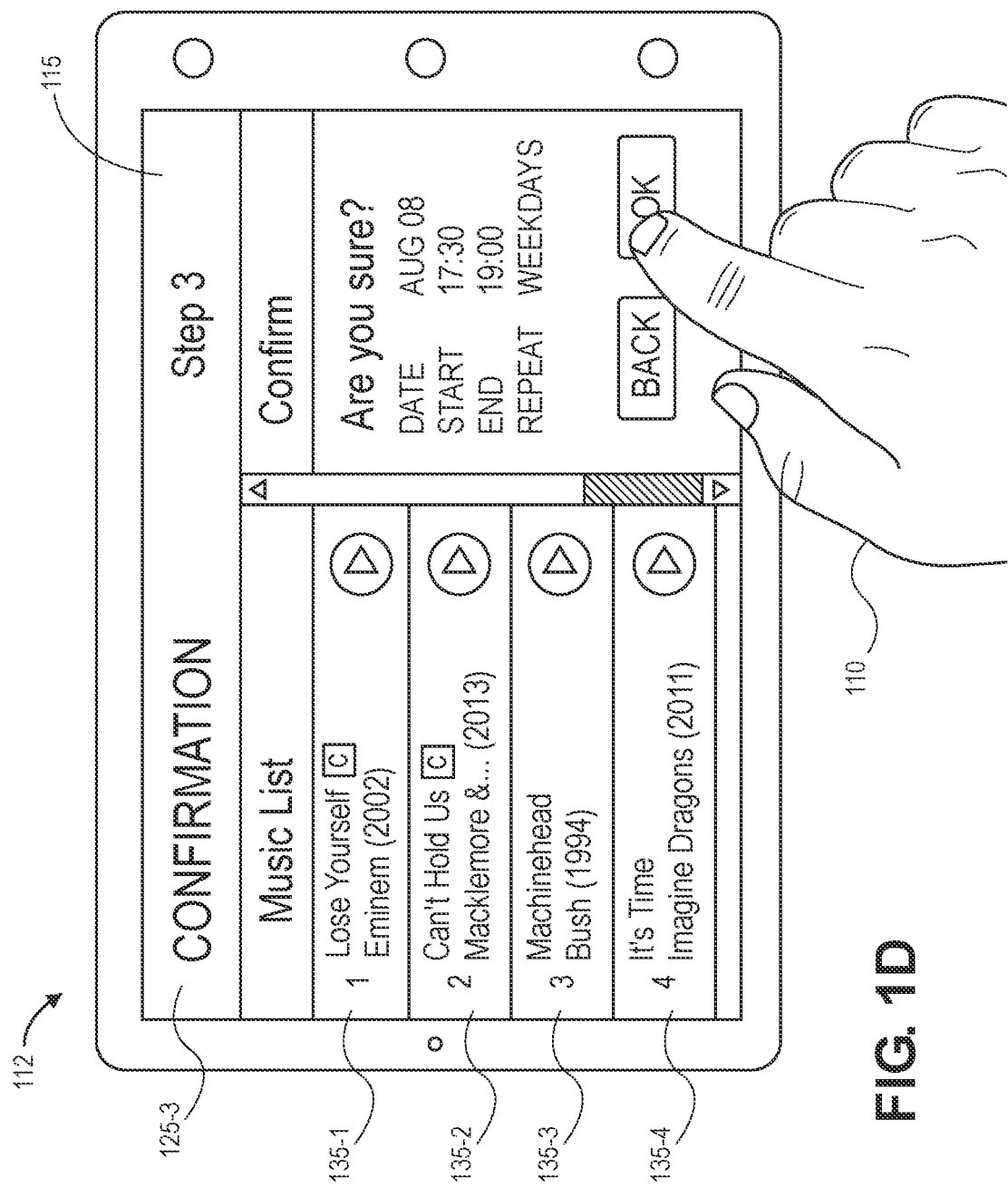

As is shown in FIG. 1D, a user interface 125-3 is rendered on the display 115 of the mobile device 112. The user interface 125-3 includes one or more identifiers of the identified or selected media entities 135-1, 135-2, 135-3, 135-4, e.g., titles of songs, artists that generated the songs, years in which the songs were released, indicators as to whether the songs include "clean" content, or explicit content, or others. The user interface 125-3 also includes interactive features that, when selected, cause samples of the media entities 135-1, 135-2, 135-3, 135-4, or the media entities 135-1, 135-2, 135-3, 135-4 in their entireties, to be played by the mobile device 112.

In accordance with implementations of the present disclosure, after the creator 110 has selected one or more media entities for potential inclusion in a media program, such as is shown in FIGS. 1C and 1D, communications channels may be established between the mobile device 112, a device 182-1 of a guest (or other participant) in the media program, or devices 182-*n* of any number of listeners to the media program, and systems such as the conference system 150-1, the broadcast system 150-2, the synchronization system 150-3, and the music source 170 shown in FIG. 1A, or others. The devices 182-1, 182-*n* may be of any type or form, including but not limited to mobile devices (e.g., smartphones, tablets or others), smart speakers, media players, computers (e.g., laptop or desktop computers), wrist watches, earphones or headphones, media streaming devices, or others.

Figure 1E:
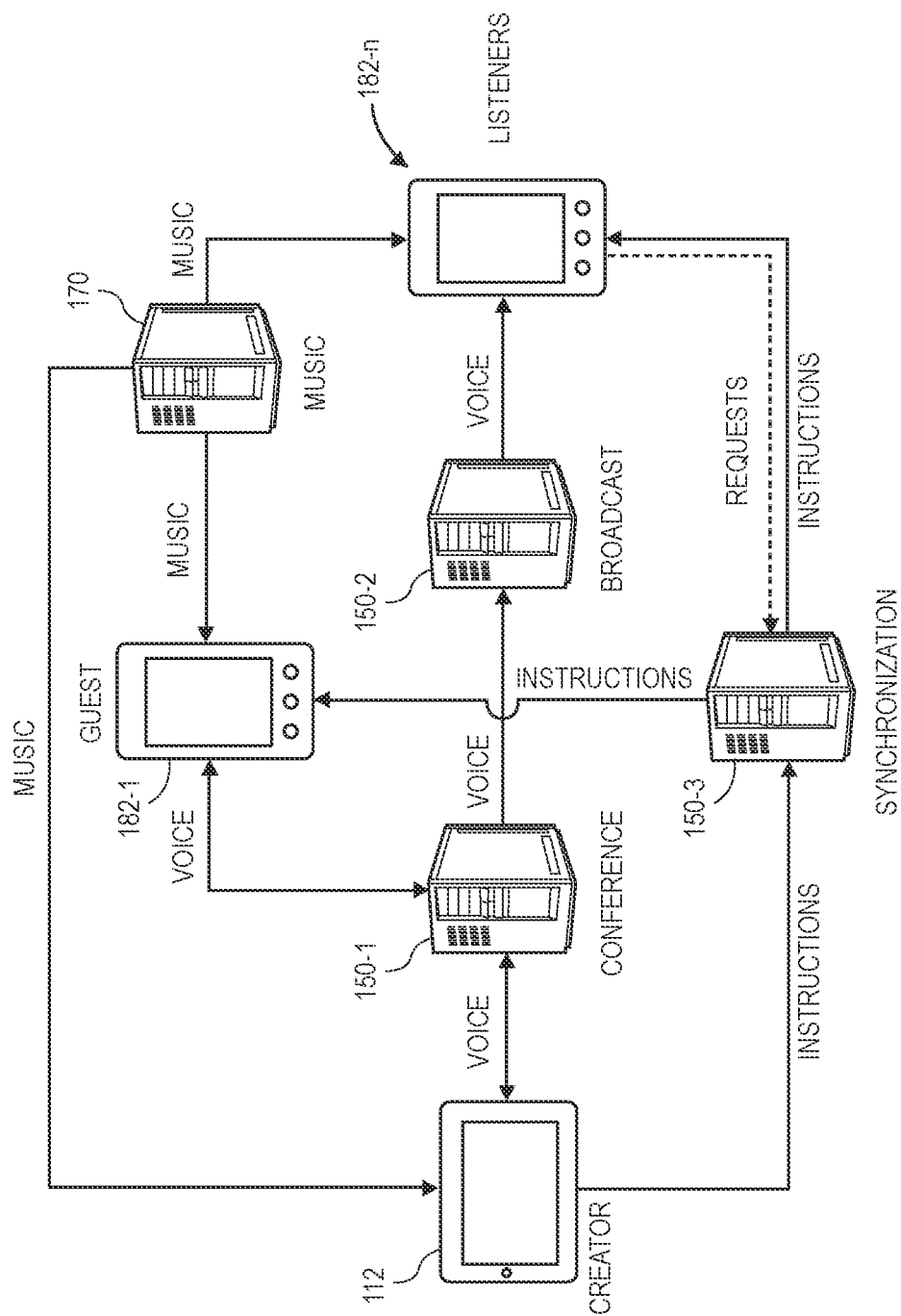

For example, as is shown in FIG. 1E, the conference system 150-1 may establish a two-way or bidirectional communications channel, e.g., a conference channel, with each of the mobile device 112 of the creator 110 and, optionally, the device 182-1 of the guest. The conference system 150-1 may also establish a one-way or unidirectional communications channel with the broadcast system 150-2, which may further establish one-way or unidirectional communications channels (e.g., broadcast channels) with the devices 182-*n* of the listeners.

Thus, where the mobile device 112 or the device 182-1 capture audio data representing voices, e.g., utterances of spoken or sung words by the creator 110 or the guest, or other live content, the audio data representing the voices or the other live content may be transmitted to any other devices that are connected to the conference system 150-1, including the other of the mobile device 112 or the device 182-1, as well as devices that are connected to the broadcast system 150-2, e.g., the devices 182-*n* of the listeners.

Additionally, as is also shown in FIG. 1E, the mobile device 112, the device 182-1 and the devices 182-*n* establish one-way or unidirectional communications channels (e.g., music channels) with the music source 170, and receive music (e.g., songs) or other media entities from the music source 170 via such channels, either in a buffering or pre-buffering format, or in any other manner and at any other time. As is further shown in FIG. 1E, the mobile device 112, the device 182-1 of the guest and each of the devices 182-*n* of listeners further establish communications channels (e.g., data channels) with the synchronization system 150-3, which is configured to receive instructions or commands regarding the playing of media content during a media program from the mobile device 112 of the creator 110, and transmit one or more instructions or commands regarding a state of the media program to the mobile device 112, the device 182-1 and the devices 182-*n* via such communications channels.

For example, upon detecting one or more instructions or commands of the creator 110 indicating that spoken or sung words by the creator 110 or the guest or any other participants are to be played during the media program, the synchronization system 150-3 may transmit one or more corresponding instructions or commands (e.g., synchronization directives) to the mobile device 112 or the device 182-1 indicating that the media program is in a voice state (or a live state, or a live media state), and audio data from the conference system 150-1 is to be played by such devices.

Likewise, the synchronization system 150-3 may further transmit one or more corresponding instructions (e.g., synchronization directives) to the devices 182-*n* of the listeners, to cause audio data from the broadcast system 150-2 to be played by such devices. Thus, the synchronization system 150-3 ensures that the mobile device 112, the device 182-1 and each of the devices 182-*n* are playing the spoken or sung words in accordance with the instructions of the creator 110, and in a synchronous manner.

Upon detecting one or more instructions or commands of the creator 110 indicating that a selected media entity is to be played, paused, stopped, rewound or fast-forwarded by such devices during the media program, e.g., by one or more voice commands or other instructions, the synchronization system 150-3 may transmit one or more corresponding instructions or commands (e.g., synchronization directives) to the mobile device 112, to the device 182-1 or to the devices 182-*n*, indicating that the media program is in a music state (or a pre-recorded state, or a pre-recorded media state), and that the selected media entity is to be played by such devices.

Thus, the synchronization system 150-3 ensures that the mobile device 112, the device 182-1 and each of the devices 182-*n* are playing the selected media entity in accordance with the instructions of the creator 110, and in a synchronous manner.

Alternatively, or additionally, the synchronization system 150-3 may detect instructions or commands of the creator 110 regarding other attributes of the media program, such as volumes or other parameters (e.g., treble, bass, or others) of the media program, e.g., by one or more interactions with the mobile device 112. In response to detecting such instructions or commands, the synchronization system 150-3 may cause the mobile device 112, the device 182-1 or the devices 182-*n* to modify audio data being played by such devices accordingly, regardless of a then-current state of the media program.

The channels or connections between the mobile device 112, the device 182-1 or any of the devices 182-*n* and the conference system 150-1, the broadcast system 150-2, the synchronization system 150-3 or the music source 170 may be established in any manner, including automatically, e.g., based upon a prior authorization of the creator 110, or the guest or the listeners associated with respective ones of the devices 182-1, 182-*n*, at or prior to the start time of the media program. Alternatively, such channels or connections may be established manually, e.g., by one or more interactions with the respective ones of the devices 182-1, 182-*n*, either prior to a start time of the media program, or after the media program has already commenced. In some implementations, tasks or functions for establishing such connections may be executed or performed by a single system or device, viz., one or more of the conference system 150-1, the broadcast system 150-2, the synchronization system 150-3 or the music source 170, or by multiple systems or devices, or any other device or system.

Figure 1F:
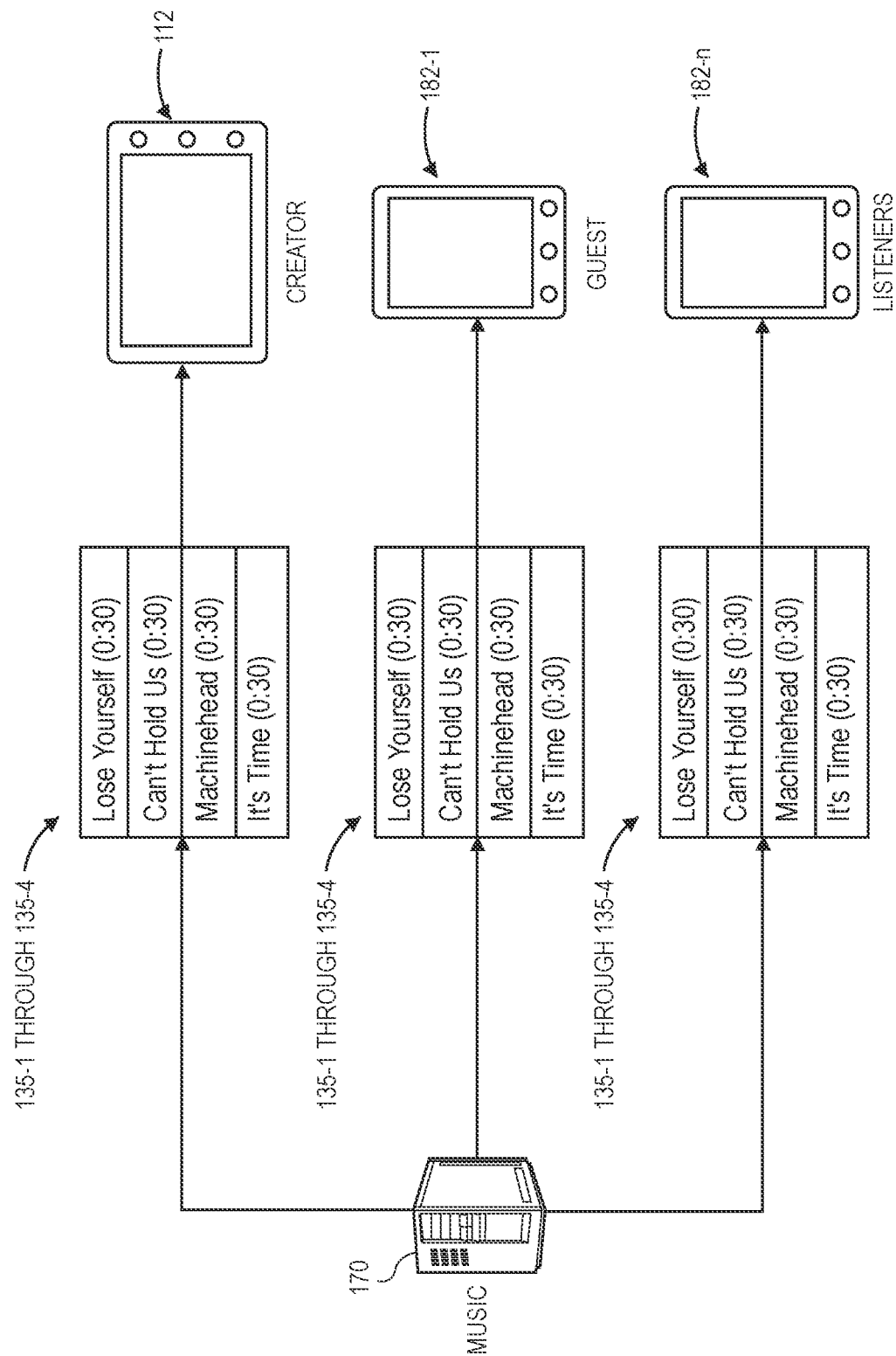

For example, as is shown in FIG. 1F, prior to a beginning of a media program, or concurrent to or following the beginning of the media program, the music source 170 may pre-buffer portions of the media entities 135-1, 135-2, 135-3, 135-4 on the mobile device 112, the device 182-1 and each of the devices 182-*n*. In some implementations, the portions may be initial portions of each of the media entities, or any other portions of the media entities, of thirty seconds or any other duration. Alternatively, or additionally, the media entities may be pre-buffered on the mobile device 112, the device 182-1 and each of the devices 182-n in their entireties. In some implementations, the media entities may be pre-buffered on any other systems associated with the mobile device 112, the device 182-1 and each of the devices 182-n.

In accordance with implementations of the present disclosure, the creator 110 may exercise control over a state of the media program, and the media content being played by the device 182-1 or the devices 182-n of the listeners, by way of the synchronization system 150-3.

Figure 1G:
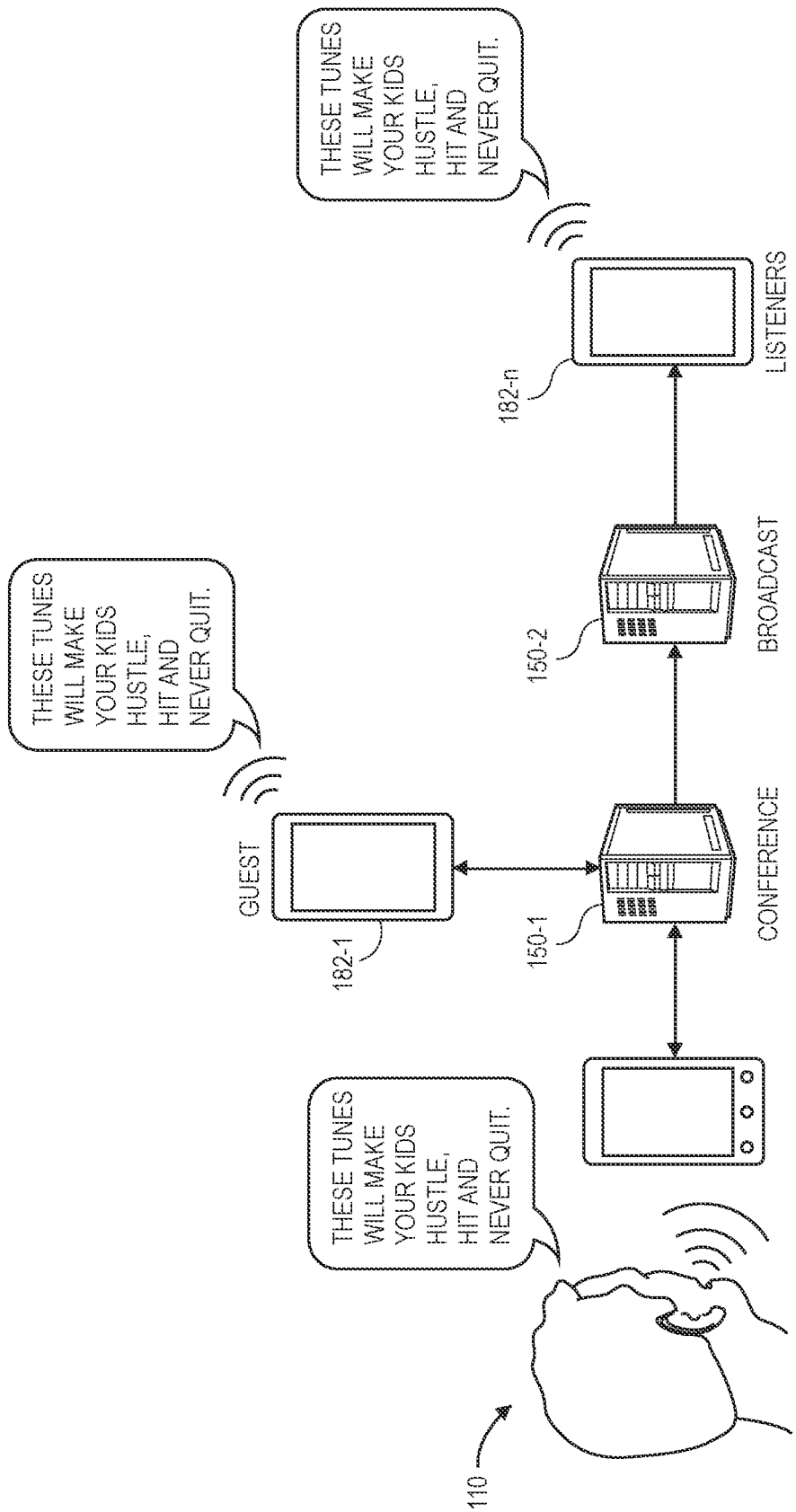

For example, as is shown in FIG. 1G, when the media program is in a voice state (or a live state, or a live media state), the synchronization system 150-3 may transmit instructions for playing audio data representing voices of the creator 110, the guest or any other participants to the mobile device 112, the device 182-1 and each of the devices 182-n. In response to such instructions, the audio data representing the voices is played by one or more applications operating on the mobile device 112, the device 182-1 and each of the devices 182-n in a synchronous manner. For example, audio data representing words of the creator 110 is captured by the mobile device 112 and transmitted to the conference system 150-1, which transmits the audio data to the mobile device 112, the device 182-1 and the broadcast system 150-2. Subsequently, the broadcast system 150-2 may further transmit the audio data to the devices 182-n of the listeners.

As is shown in FIG. 1H, when the media program transitions from the voice state (or the live state, or a live media state) to a music state (or a pre-recorded state, or a pre-recorded media state), the synchronization system 150-3 may transmit instructions for playing audio data representing media entities identified or selected by the creator 110 to the mobile device 112, the device 182-1 and each of the devices 182-n. In response to such instructions, the mobile device 112, the device 182-1 and each of the devices 182-n ensure that audio data representing the media entities is played by such devices following the audio data representing the voices of the creator 110, the guest or any other participants, such that the transition from the voice state to the music state in accordance with the media program occurs seamlessly for each of the listeners. For example, the synchronization system 150-3 may identify one of the media entities 135-1, 135-2, 135-3, 135-4 that has been identified or selected by the creator 110 and pre-buffered on the mobile device 112, the device 182-1 and each of the devices 182-n, and transmit an instruction for causing the one of the media entities 135-1, 135-2, 135-3, 135-4 to be played by such devices, in the pre-buffered format, or streamed to such devices by the music system 170.

In some implementations, a music state (or a pre-recorded state, or a pre-recorded media state) may be identified with respect to not only a media entity that is then being played in accordance with a media program but also a point or a time of the media entity that is then being played, e.g., a seek point. Thus, where another listener requests to join a media program, and a media entity is then being played during the media program, the synchronization system 150-3 may transmit not only an indicator that the media program is in the media state but also an identifier of the media entity and a seek point of the media entity to the device of the listener, which may then buffer or pre-buffer the media entity thereon before beginning to play the media entity at the seek point. Subsequently, the device may further pre-buffer any other media entities that may have been identified or selected by the creator, but may alternatively decline to pre-buffer media entities that have already been played during the media program, as such media entities may be unlikely or unable to be played again during the media program.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Currently, voice communications such as voice over Internet Protocol, or "VOIP," may be distributed over one or more networks using one or more real-time communication solutions. Similarly, high-quality media content such as audio data, video data, or other content may be effectively distributed using one or more content delivery networks (or "CDN") or other solutions. Whereas voice-based solutions may be readily optimized for low bandwidth or unreliable network connectivity, with a low sampling rate and one or more recovery solutions, making high-fidelity music or other media content available at a high sampling rate, and in stereo, often requires the continued availability of high bandwidth network communications and pre-buffering to account for occasional variations in network availability.

Many network-based media programs enable large audiences of viewers or listeners to receive media content, to participate in the media programs (e.g., by providing voice-based or text-based feedback, or interactions with one or more other icons or features presented in one or more user interfaces). In order to ensure that listeners may provide timely and relevant feedback during a media program, media content of the media program, including not only voice (e.g., spoken or sung words) but also music or other content, is delivered synchronously, or nearly simultaneously, to each of the listeners within a finite period of time, such as less than one second. Failing to deliver media content to listeners of the media program in a synchronous manner may render listener feedback stale, or in discord with the media content then being played. For example, if a creator of a media program tells a joke before a guest begins to play a song, and the transmission or receipt of audio data representing the joke with respect is not properly synchronized with the transmission or receipt of audio data representing the song, audience laughter or other replies to the joke may be received following an undue delay, e.g., after the guest has begun playing the song. As a result, the guest may interpret the laughter or other replies in response to the joke as feedback in response to his or her efforts in playing the song, an experience that may be unsettling for the guest, and uncomfortable for the audience.

The systems and methods of the present disclosure are directed to synchronizing live and pre-recorded content during one or more live broadcasts of a media program, and with limited or no latency. Such systems and methods may include computer devices or systems of creators, e.g., mobile devices, smart speakers or others, that may effectively act as a "control panel" for orchestrating the synchronization of media content that is to be delivered to the audience, by way of a synchronization system or module.

The systems and methods of the present disclosure may include a conference system (or module) that enables a creator of a media program and any participants in the media program to engage in conversation, which may be transmitted to devices of any number of listeners via a broadcast system (or module) to which each of such devices of listeners may be connected. Such systems and methods may also include a media source (e.g., a music source) that operates in parallel to the conference system, and transmits content from one or more selected media entities to devices of listeners or any other devices or systems, and buffers (or pre-buffers) the selected media entities at such points. The media source may further cause any other media content to be transmitted to devices of listeners to a media program at any other time and in any other manner in accordance with implementations of the present disclosure.

The systems and methods of the present disclosure may also include a synchronization system (or module) that receives, detects or interprets instructions or commands executed or otherwise made by a creator of a media program regarding the playing of media content, and likewise instructs or commands each of the devices of listeners to mix or deliver media content in accordance with the instructions or commands of the creator. The synchronization system may be or act as a state manager system (or module) that determines and maintains a record of a state of a media program. Devices of listeners who intend to join a media program in progress may be synchronized with the media program based on a state determined or maintained by the state manager system. Instructions or commands received from a creator may be determined and transmitted by the synchronization system to devices of listeners in accordance with a state of the media program.

Media content that may be included in a media program includes, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

The various aspects of the present disclosure described herein, e.g., the devices of creators, participants or listeners, as well as the conference systems, the broadcast systems, the media systems, the synchronization systems or the state management systems may be embodied directly in hardware components, in software modules stored on one or more memory components and executed by one or more processors, or in a combination of hardware components and software modules in accordance with implementations of the present disclosure.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
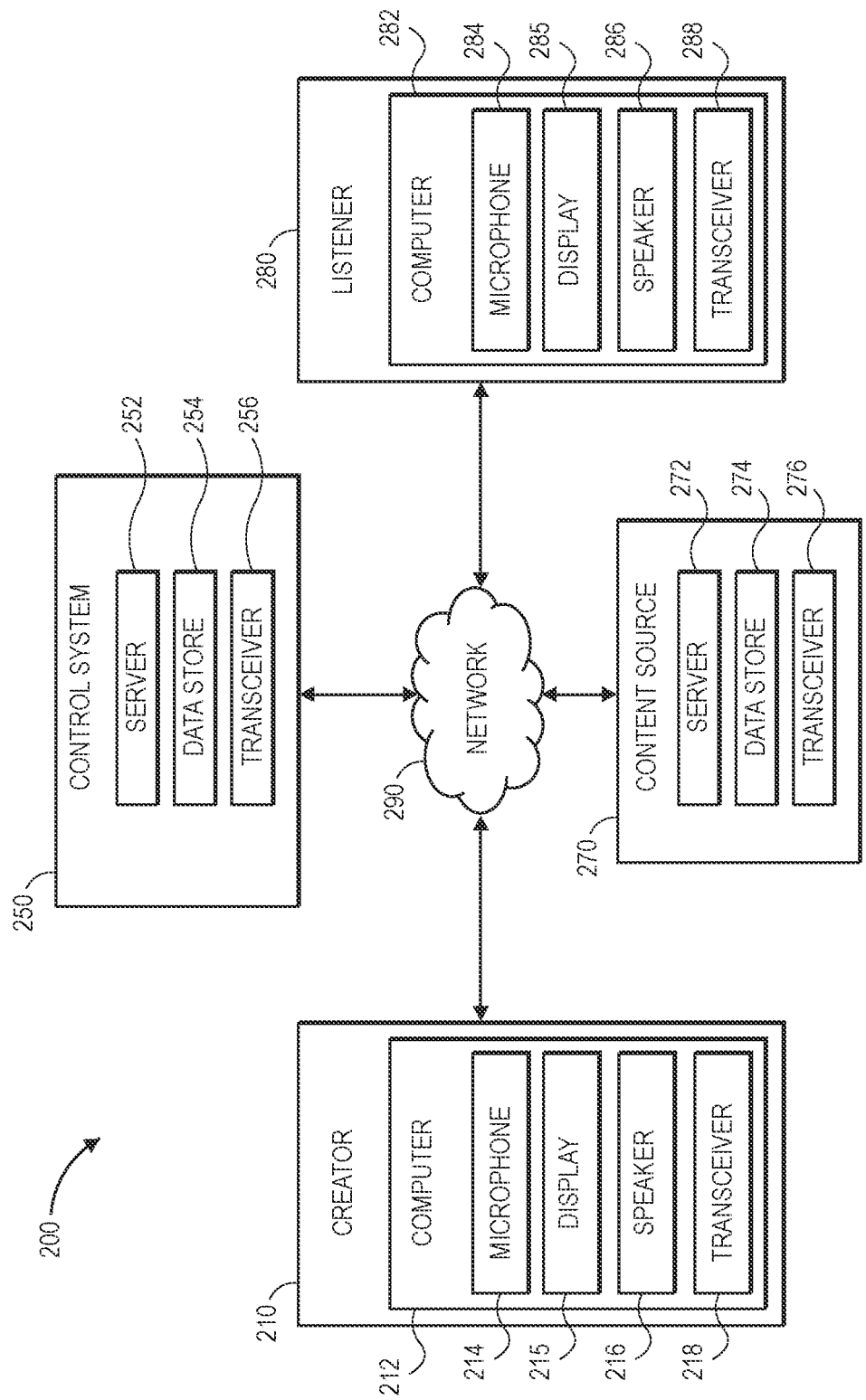
FIGS. 2A and 2B are block diagrams of components of one system for synchronizing live and pre-recorded content of media programs in accordance with embodiments of the present disclosure.
Figure 2B:
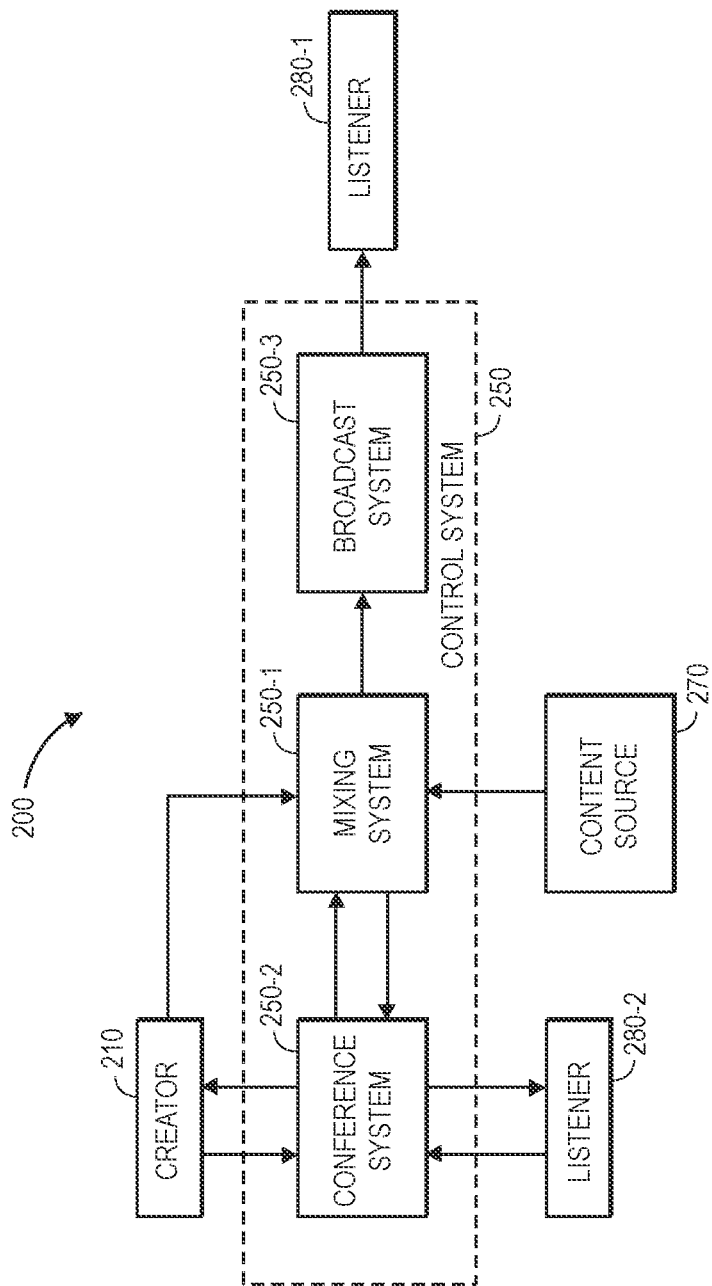

Referring to FIGS. 2A and 2B, block diagrams of components of one system 200 for synchronizing live and pre-recorded content of media programs in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1H.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMS, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
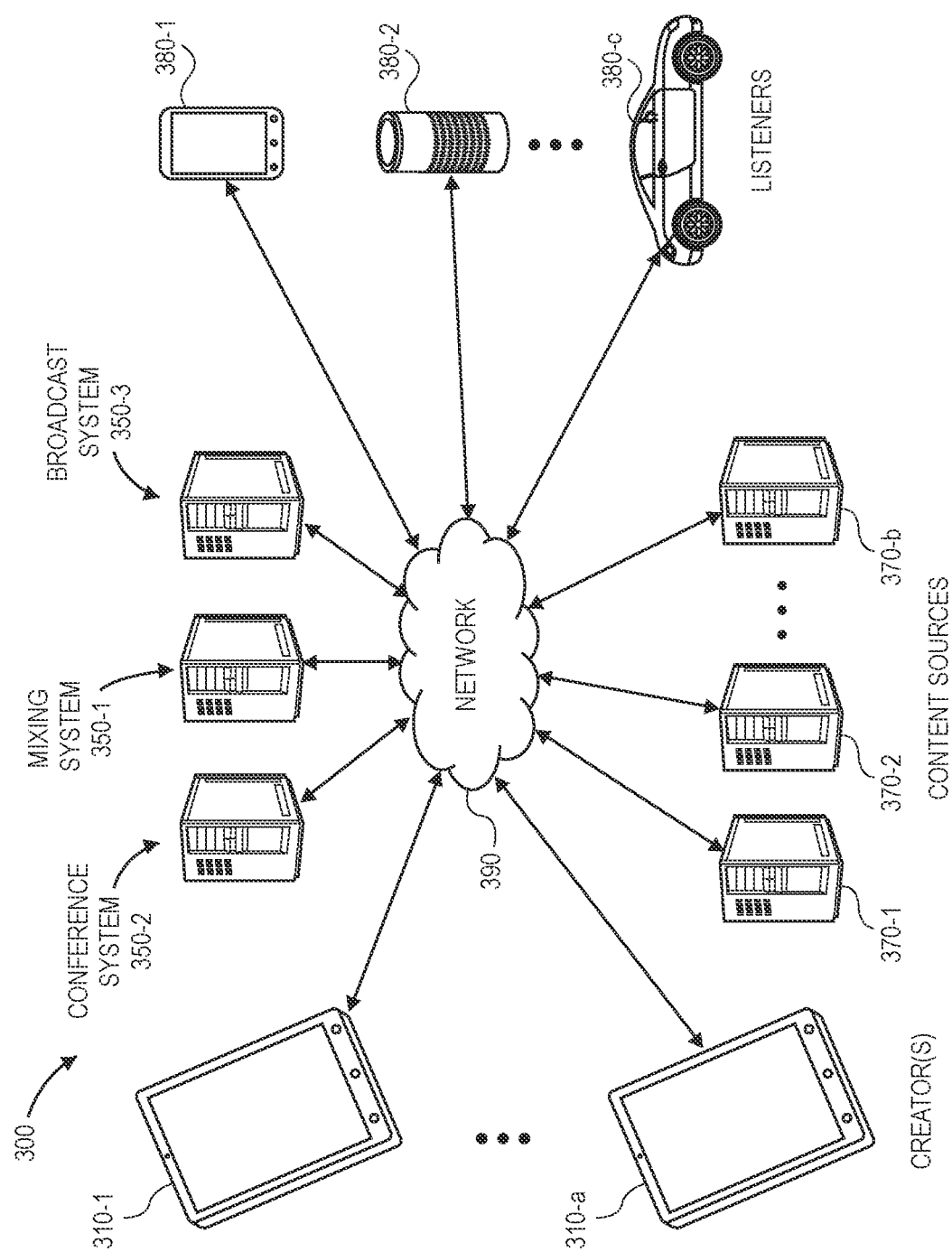
FIG. 3 is a view of aspects of one system for synchronizing live and pre-recorded content of media programs in accordance with embodiments of the present disclosure.

Referring to FIG. 3, a view of aspects of one system for synchronizing live and pre-recorded content of media programs in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-*a*, a mixing system 350-1, a conference system 350-2, a broadcast system 350-3, a plurality of content sources 370-1, 370-2 . . . 370-*b* and a plurality of listeners 380-1, 380-2 . . . 380-*c* that are connected to one another over a network 390, which may include the Internet in whole or in part.

The creators 310-1 . . . 310-*a* may operate a computer system or device having one or more microphones, an interactive display, one or more speakers, one or more processors and one or more transceivers configured to enable communication with one or more other computer systems or devices. In some implementations, the creators 310-1 . . . 310-*a* may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a* may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources **370-1, 370-2 . . . 370-*b* may be servers or other computer systems having media content stored thereon, or access to media content, that are configured to transmit media content to the creators 310-1 . . . 310-*a* or any of the listeners 380-1, 380-2 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1**, or the types of media content stored thereon or accessible thereto, is not limited.

The listeners **380-1, 380-2 . . . 380-*c*** may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators **310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2, 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a*** or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4A:
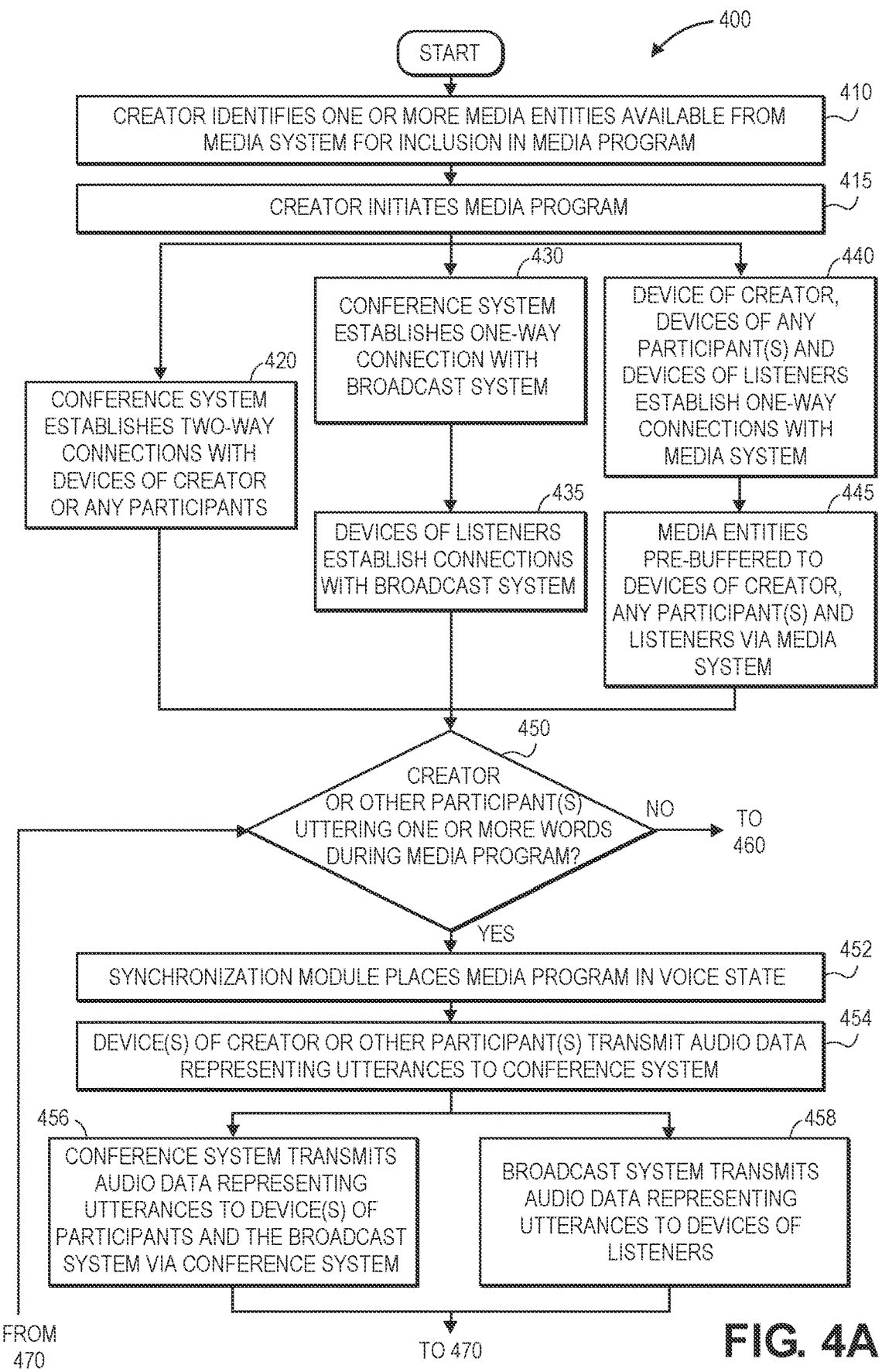
FIGS. 4A and 4B are a flow chart of one process for synchronizing live and pre-recorded content of media programs in accordance with embodiments of the present disclosure.
Figure 4B:
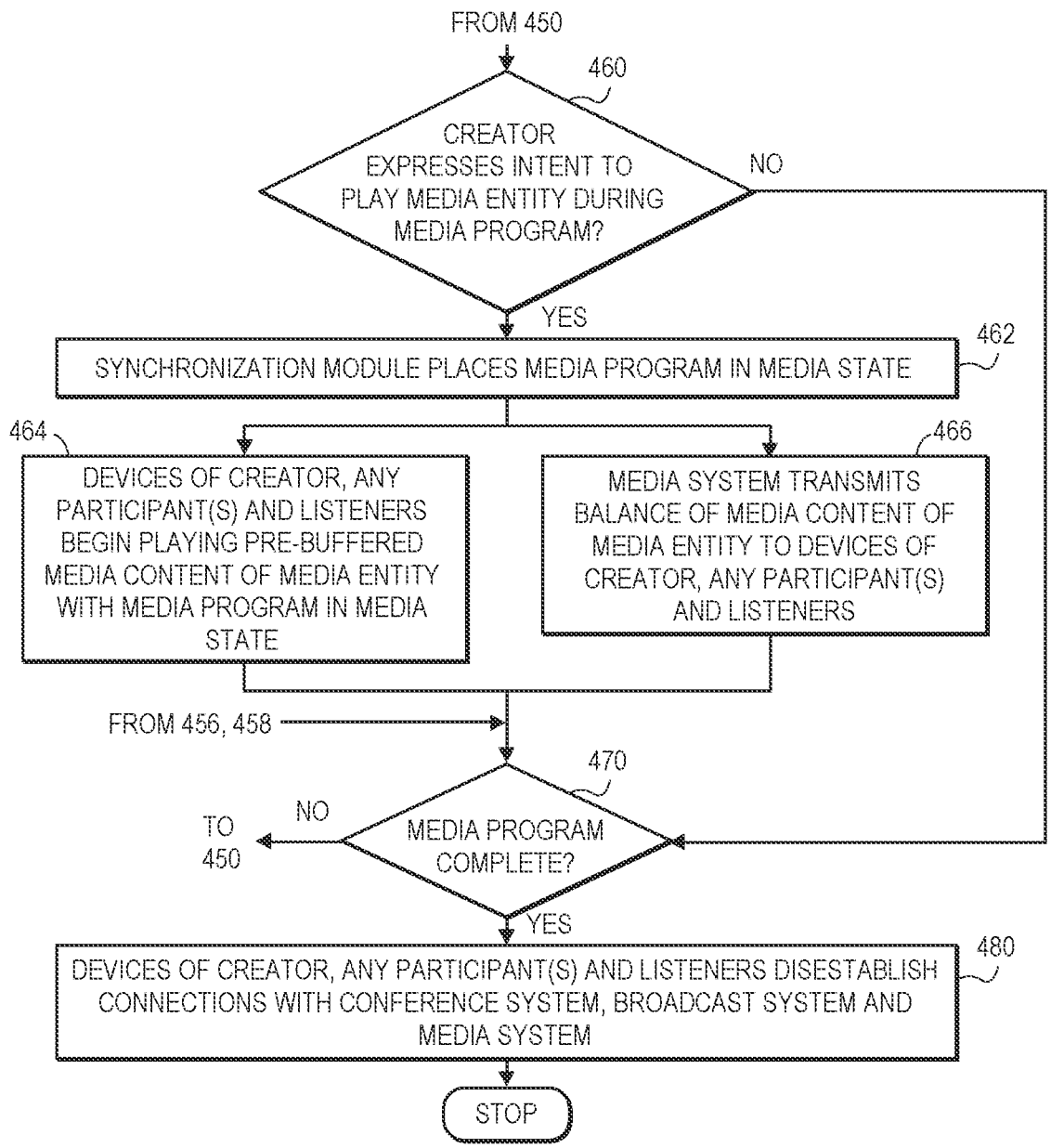

Referring to FIGS. 4A and 4B, a flow chart of one process for synchronizing live and pre-recorded content of media programs in accordance with embodiments of the present disclosure is shown. At box 410, a creator identifies one or more media entities (e.g., songs) that are available from a media system for inclusion in an upcoming media program. For example, the media entities may be any media content of any type or form, such as movies, songs (or titles), shows, as well as descriptors of media content, e.g., one or more eras, genres, moods or other descriptors. The media entities may also include any files or physical or virtual representations of media content, e.g., albums, playlists, soundtracks or others, as well as any entities associated with the media content, e.g., artists, groups, labels, producers, services, stations or others.

The creator may identify the media entities by one or more interactions with a user interface rendered in a display of the device or system, by one or more voice commands captured by a microphone of the device or system, or in any other manner. For example, the media entities may be identified by an artist, an era, a genre, a mood, a playlist, a title, or any other attribute or parameter of media content of the media entities, which may include but need not be limited to songs or other music files from a music catalog, repository or streaming service; advertisements of items, goods or services; or one or more news, sports or weather programs, as well as spoken or sung words or music of a creator or one or more guests, such as musicians, celebrities, personalities, athletes, politicians, or artists, or any listeners to the media program.

In some implementations, the media entities may be identified in a non-binding or a non-limiting manner, and may include any media entities of interest to the creator or any participants or listeners, or media entities that might be played by the creator during the media program, at his or her discretion. The creator need not be limited to playing only media entities identified at box 410 during the media program. The media entities may be identified or selected prior to a start of the media program, or, alternatively, while the media program is in progress.

At box 415, the creator initiates the media program via a computer device. For example, the creator may initiate the media program by one or more interactions with a user interface, by one or more voice commands, or in any other manner, either at a previously scheduled time or on a previously scheduled day, or at any other time or on any other day, e.g., spontaneously at the discretion of the creator. Alternatively, the media program may be automatically initiated at a previously scheduled time or on a previously scheduled day.

At box 420, a conference system establishes a two-way connection (or communication channel) with the device of the creator, and two-way connections (or communication channels) with any number of devices of participants (e.g., guests) in the media program, such as one or more listeners or other entities who have joined the media program, or requested or agreed to participate in the media program. The conference system may establish a two-way communications channel, e.g., a conference channel, with the device of the creator or the devices of the participants in any manner, such as by WebSocket or any other technique or protocol. Upon establishing the two-way connections with the devices of the creator and, alternatively, devices of any participants, data representing audio signals generated by the creator or the participants may be captured by the respective devices and transmitted to the conference system, and subsequently transmitted to each of the devices for which two-way connections have been established. In some implementations, the two-way connection between the device of the creator and the conference system may be established at any time prior to or concurrent with the initiation of the media program ta box 415. Likewise, in some implementations, the two-way connections between devices of the participants and the conference system may be established when such participants join the media program, or request or agree to participate in the media program. For example, in some implementations, where a listener to the media program requests to join or participate in the media program, a one-way connection between a device of the listener and a broadcast system may be disestablished and a two-way connection between the device of the listener and a broadcast system may be established to permit the listener to participate in the media program.

In parallel, at box 430, the conference system establishes a one-way connection (or communication channel) with the broadcast system. For example, the conference system may establish the one-way connection to permit the broadcast system to receive audio data from the conference system, but not provide audio data to the conference system, during the media program. Alternatively, in some implementations, the conference system may establish a two-way connection with the broadcast system, and may mute, restrict or otherwise inhibit the broadcast system from sending audio data to the conference system.

At box 435, the devices of the listeners establish one-way connections (or communication channels) with the broadcast system. Upon establishing the one-way connections with the devices of the listeners, data representing audio signals generated by any device or system having a two-way connection with the conference system, e.g., live media content, such as voices, may be subsequently transmitted to each of the devices of the listeners.

Also in parallel, at box 440, the device of the creator, the devices of any other participants in the media program and the devices of any number of listeners to the media program establish one-way connections with the media system. Upon establishing the one-way connections with the media system, data representing any number of media entities may be subsequently transmitted to each of such devices, either in a buffering or pre-buffering manner, or in any other manner.

At box 445, the media entities identified by the creator at box 410 are pre-buffered to the device of the creator, devices of any participants in the media program, and devices of the listeners to the media program by the media system.

For example, in some implementations, the media entities may be transmitted in their entireties to the devices of the creator, the participants and the listeners in their entirety by way of the one-way connections. Alternatively, in some implementations, portions of the media entities, such as initial durations or intervals of the media entities (e.g., the first fifteen seconds, thirty seconds, sixty seconds, or any other durations or intervals of such media entities), or initial portions of data of the media entities (e.g., the first hundred kilobytes, the first megabyte, or the first portion of data of any size), may be streamed to the devices of the listeners.

In some implementations, the media entities may be cached or stored by a content delivery network, e.g., on one or more devices or systems that are geographically or functionally proximate each of the devices of the listeners.

At box 450, whether the creator or any of the participants are uttering any words during the media program is determined. For example, the creator or any other participants may speak or sing words that are captured by a microphone of the device of the creator, or an auxiliary device, e.g., ear buds, a headset, or any other system. Data representing such words may be transmitted to the conference system. The devices of the creator or the participants, or the conference system, may determine that the creator or any participants is uttering the words on any basis.

If the creator or any participants is uttering words, then the process advances to box 452, where the synchronization module places the media program in a voice state, and any devices of the creator, any participants, or the listeners may be configured to receive audio data representing spoken or sung words with the media program in the voice state.

In some implementations, the creator may manually indicate that the media program is in a voice state, or instruct or command that the media program be placed in the voice state, e.g., by one or more interactions with a user interface or voice commands. In some implementations, the conference system or any other system may automatically determine that the media program is in a voice state.

At box 454, the devices of the creator or the devices of the other participants transmit audio data representing such utterances to the conference system, e.g., via one or more of the two-way connections established at box 420.

At box 456, the conference system transmits the audio data representing the utterances to the devices of the creator or the other participants and the broadcast system, e.g., via one or more of the two-way connections established at box 420, or via the one-way connection established at box 430.

In parallel, at box 458, the broadcast system transmits the audio data representing the utterances to the devices of the listeners e.g., via one or more of the one-way connections established at box 440.

In some implementations, with the media program in a voice state (or a live state, or a live media state), any listener may request to join the media program, e.g., by establishing one-way communications connections with the synchronization system, the broadcast system, the media system, or any other computer devices or systems. Once a device of the listener has established such connections, the synchronization system will instruct the device of the listener that the media program is in the voice state, and cause the audio data representing the utterances to be transmitted to the devices of the listeners and played by one or more applications operating thereon.

At box 460, whether the creator has expressed an intent to play a media entity during the media program is determined. The creator may express an intent to play the media entity in any manner, such as by one or more interactions with a user interface, a button or another feature of a device of the creator, by one or more voice commands, or in any other manner. For example, the customer may contact one or more buttons or other interactive features that are configured to initiate a playing of the media entity, or make one or more utterances identifying the media entity or the intent, such as, "now I'm going to play a song for you," followed by a name of a media entity, or other words or sets of words.

If the creator has expressed an intent to play a media entity during the media program, then the process advances to box 462, where the synchronization module places the devices of the creator, devices of the other participants, or devices of listeners in a media state.

At box 464, the devices of the creator, the other participants, and the listeners begin playing the pre-buffered media content of the media entity. For example, the synchronization module may provide the devices with one or more instructions or commands to initiate a playing of a media entity identified by the creator at box 410 that has been pre-buffered on each of such devices, e.g., in a synchronous manner. In some other implementations, the synchronization module may determine whether a media entity selected by the creator for playing has been pre-buffered on the devices of the creator, the other participants, and the listeners. If the media entity selected by the creator for playing has not been pre-buffered on such devices, then the synchronization module may provide one or more instructions or commands to such devices to retrieve the media entity from the media system, or providing the media system with one or more instructions to transmit the media entity to such devices. Alternatively, the synchronization module may initiate the playing of the media by such devices in any other manner.

In parallel, at box 466, the media system transmits a balance of the media content of the media entity to the devices of the creator, the other participants, and the listeners. For example, in some implementations, the devices of the creator, the other participants, and the listeners may be pre-buffered with portions of one or more media entities (e.g., less than all of such media entities) and, in response to one or more of such instructions or commands, e.g., a synchronization directive, cause a portion of a selected one of such media entities to be played by each of such devices in a synchronous manner. As the portion of a selected media entity is played, a balance of the selected media entity that has not been pre-buffered on the devices may be transmitted to each of such devices over one or more networks, e.g., by one-directional connections between a source of the selected media entity and each of such devices.

In some implementations, with the media program in a media state (or a pre-recorded state, or a pre-recorded media state), any listener may request to join the media program, e.g., by establishing one-way communications connections with the synchronization system, the broadcast system, the media system, or any other computer devices or systems. Once a device of the listener has established such connections, the synchronization system will not only instruct the device of the listener that the media program is in the media state but also identify a seek point of a media entity, or a point or a time of the media entity, that is then being played with the media program in the media state. The device of the listener may then begin playing the media entity at the seek point played by one or more applications operating thereon, once the media entity has been sufficiently buffered on the device of the listener. Any other media entities that have been identified by the creator at box 410, such as media entities that have not yet been pre-buffered on the device of the listener, or have not yet been played during the media program, may then be pre-buffered on the device of the listener.

At box 470, whether the media program is complete is determined. For example, the media program may be scheduled with a finite duration between a start time and an end time, and may be deemed complete at the end time. Alternatively, or additionally, the media program may be terminated at the control or discretion of the creator, e.g., by one or more instructions or commands.

If the media program is not yet complete, then the process returns to box 450, where whether the creator or any of the participants are uttering any words during the media program is determined.

If the media program is complete, however, then the process advances to box 480, where the devices of the creator, the other participants, and the listeners disestablish connections with the conference system, the broadcast system and the media system, and the process ends.

Figure 5:
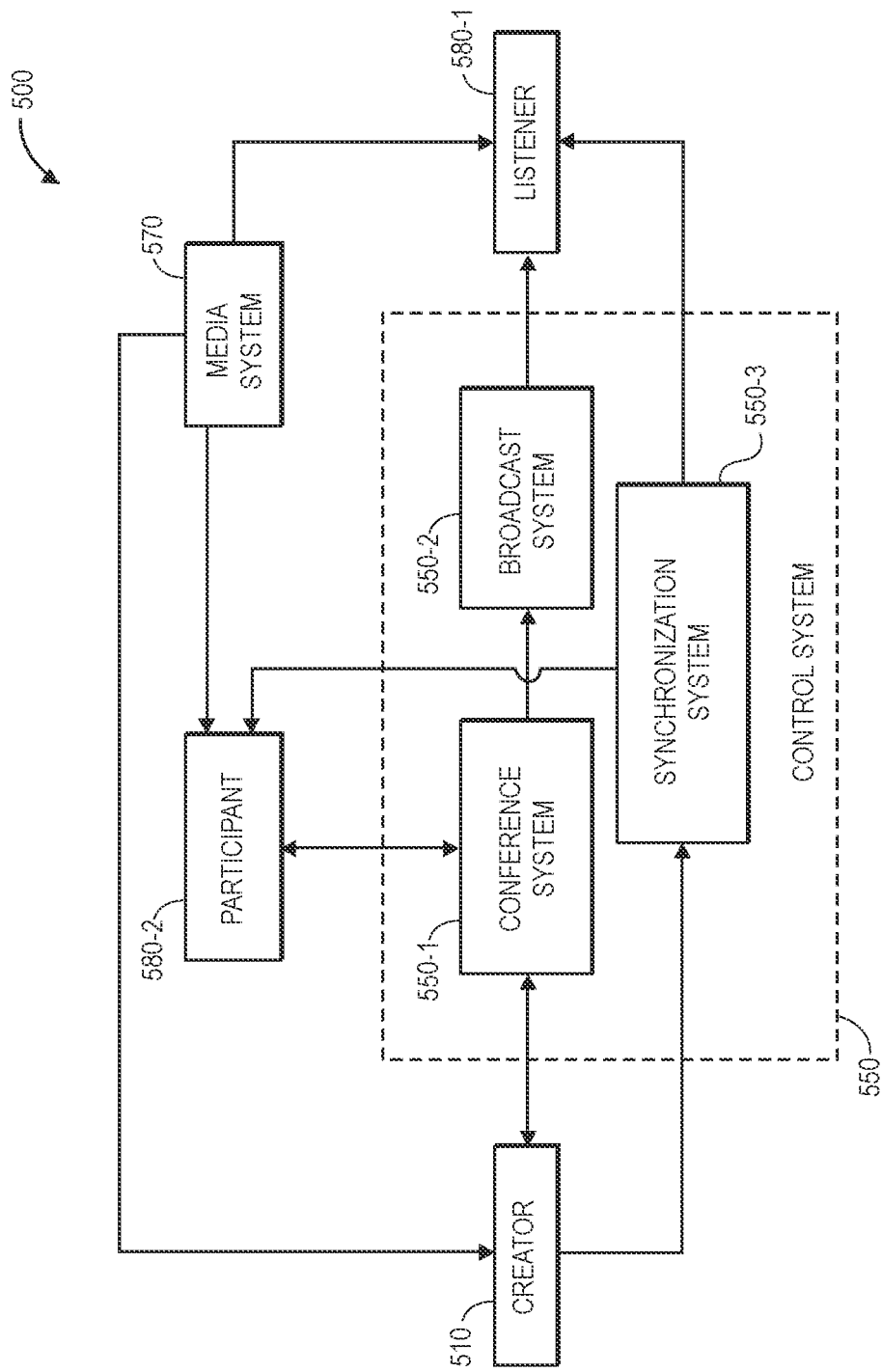
FIG. 5 is a view of aspects of one system for synchronizing live and pre-recorded content of media programs in accordance with embodiments of the present disclosure.

Referring to FIG. 5, a view of aspects of one system for synchronizing live and pre-recorded content of media programs in accordance with embodiments of the present disclosure is shown. Except where otherwise noted, reference numerals preceded by the number "5" shown in FIG. 5 indicate components or features that are similar to components or features having reference numerals preceded by the number "3" shown in FIG. 3, by the number "2" shown in FIG. 2A or FIG. 2B or by the number "1" shown in FIGS. 1A through 1H.

As is shown in FIG. 5, the system 500 includes a control system 550 in communication with a creator 510 of a media program, a listener 580-1 to the media program and, optionally, a participant 580-2 in the media program. The control system 550 may be a single computer device or system, e.g., a server, or multiple computer devices or systems that are coupled to or otherwise associated with one another.

The creator 510 and the participant 580-2 are connected to a conference system 550-1 of the control system 550 by two-way communications channels (e.g., a conference channel). Additionally, a broadcast system 550-2 of the control system 550 is connected to the conference system by a one-way communications channel or, alternatively, a two-way communications channel. Likewise, the listener 580-1 is also connected to the broadcast system 550-2 by a one-way communications channel (e.g., a broadcast channel). Thus, the conference system 550-1 is capable of receiving audio data representing voices (e.g., spoken or sung words) of the creator 510 or the participant 580-2, and transmitting such audio data to the devices of the creator 510 and the participant 580-2 directly, as well as to a device of the listener 580-1 via the broadcast system 550-2.

Additionally, a media system 570 (e.g., a source of media entities or other media content of any type or form) is connected to each of the creator 510, the listener 580-1 and the participant 580-2, e.g., by one-way communications channels. Thus, the media system 570 is configured to transmit audio data representing media entities (e.g., songs) or other media content to each of the devices of the creator 510 and the participant 580-2 directly, as well as to the device of the listener 580-1. The media system 570 may be a music catalog, repository or streaming service having access to songs or other media entities. Alternatively, the media system 570 may have access to any other media entities, including but not limited to advertisements, news, sports or weather programs, or any others.

The synchronization system 550-3 of the control system 550 is in communication with each of the creator 510, the listener 580-1 and the participant 580-2. When the creator 510 executes one or more instructions or commands regarding a media program, the synchronization system 550-3 interprets such instructions or commands to determine whether the media program is in a voice state (or a live state, or a live media state), during which the media program is primarily dedicated to airing live media content, such as voices of the creator 510 or the participant 580-2, or a media state (or a pre-recorded state, or a pre-recorded media state), during which the media program is primarily dedicated to airing pre-recorded media content, such as songs or other media entities. The synchronization system 550-3 then transmits instructions or commands to the device of the listener 580-1 and the device of the participant 580-2, in a manner consistent with the instructions or commands of the creator 510, to ensure that such devices play voices or media in a synchronized manner.

For example, when the media program transitions from the voice state (or the live state, or a live media state) to a music state (or a pre-recorded state, or a pre-recorded media state), or vice versa, the synchronization system 550-3 may transmit instructions for playing audio data representing media entities (or other pre-recorded content) or audio data representing voices (or other live content), to devices of the creator 510, the listener 580-1 or the participant 580-2, such that the transition from the voice state to the music state, or vice versa, occurs seamlessly in accordance with the media program. Alternatively, the synchronization system 550-3 may be a software module that operates in parallel with audio channels associated with the conference system 550-1 or the broadcast system 550-2, and transmits instructions or commands regarding the playing of media content that are consistent with the instructions or commands of the creator via a data channel.

Although FIG. 5 includes a single box corresponding to a listener 580-1, a single box corresponding to a participant 580-2 and a single box corresponding to a media source 570, the systems and methods of the present disclosure may provide media content to any number of listeners 580-1, including voices of the creator 510 and any number of participants 580-2, as well as media entities or other media content obtained from any number of media sources 570 in accordance with implementations of the present disclosure.

Figure 6A:
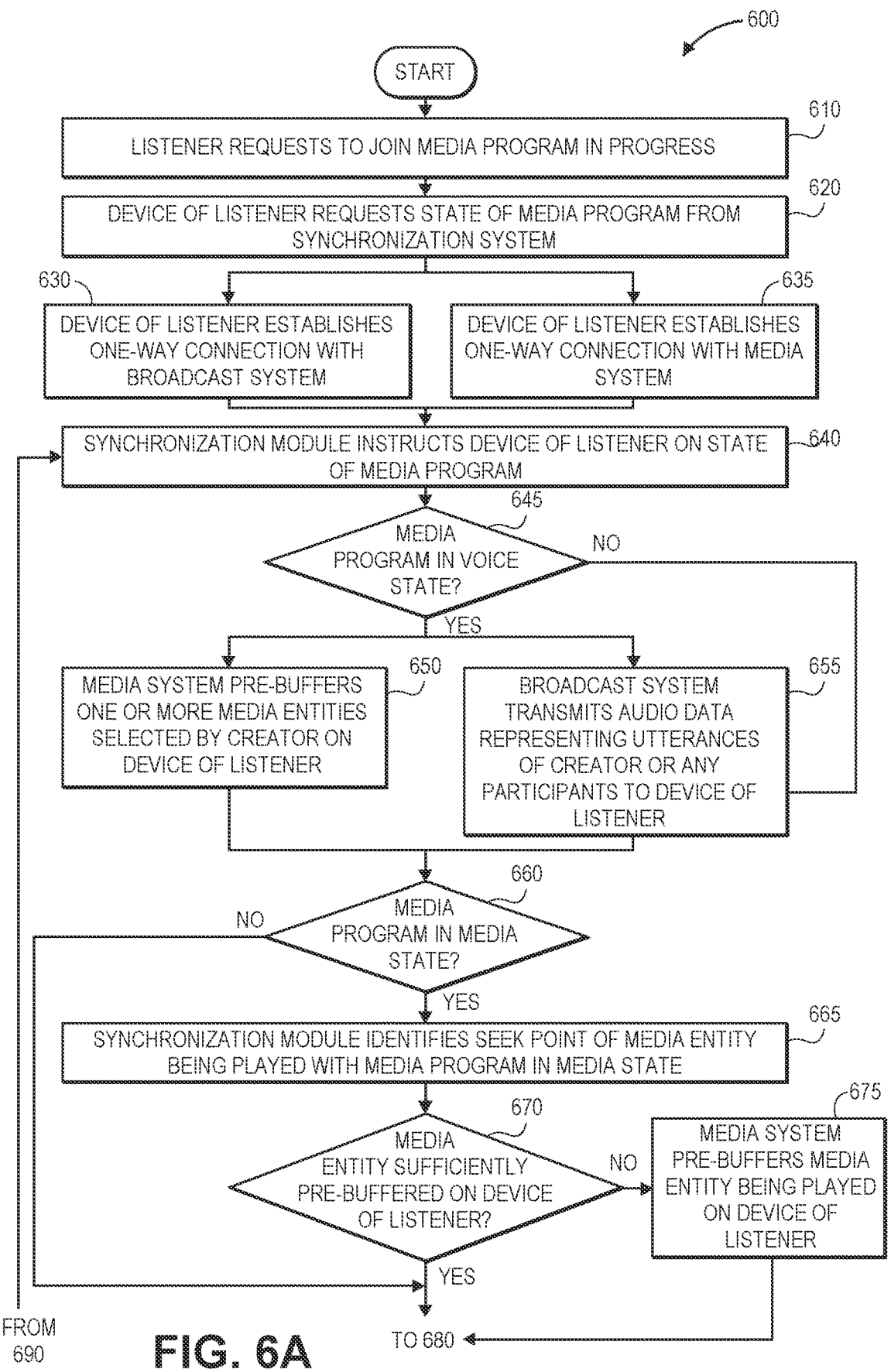
FIGS. 6A and 6B are a flow chart of one process for synchronizing live and pre-recorded content of media programs in accordance with embodiments of the present disclosure.
Figure 6B:
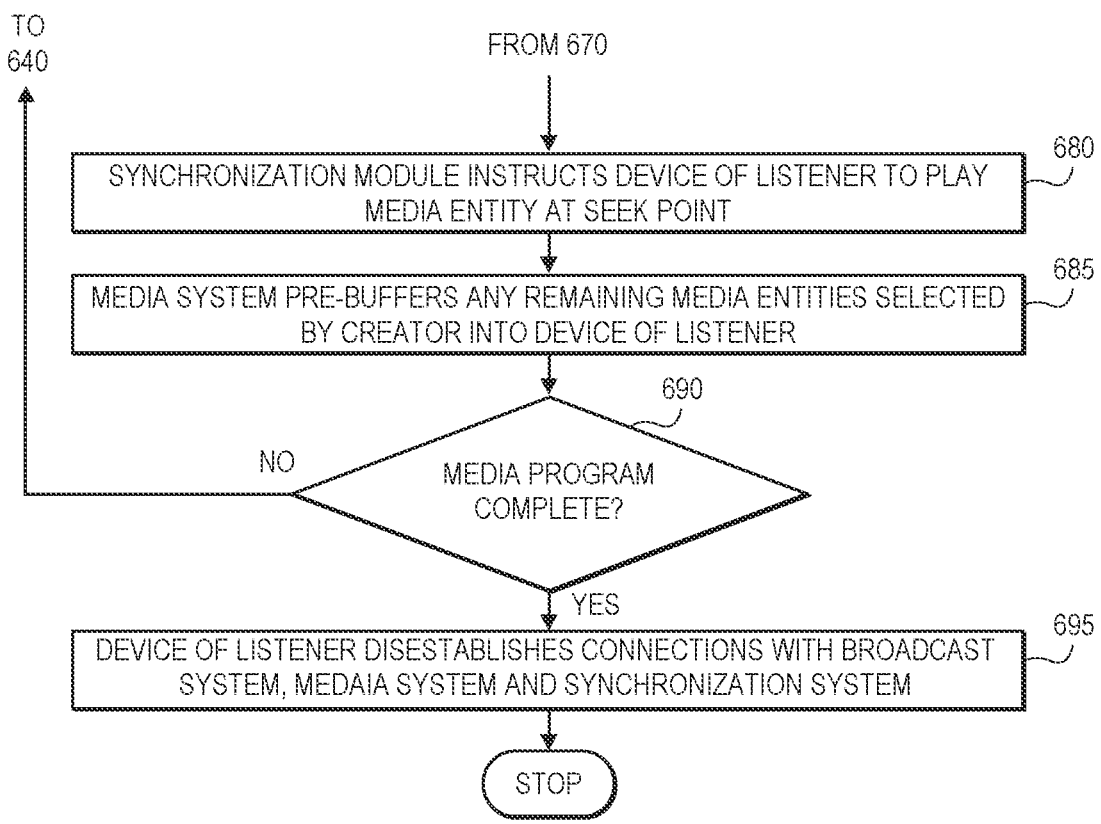

Referring to FIGS. 6A and 6B, a flow chart of one process for synchronizing live and pre-recorded content of media programs in accordance with embodiments of the present disclosure is shown. At box 610, a listener requests to join a media program that is in progress, e.g., currently being aired "live." For example, the media program may be in a voice state, such that words that are spoken or sung live by the creator or any participants (e.g., guests) are transmitted to devices of the creator and such participants, and to devices of any listeners to the media program, over one or more networks. Alternatively, the media program may be in a pre-recorded media state (e.g., a music state, or a pre-recorded state), such that media entities that were recorded prior to the listener's request to join the media program are being played by devices of the creator or such participants, or by devices of any listeners. The listener may request to join the media program in any manner, such as by gestures or other interactions with one or more interactive features of a user interface of a media playing device or application, by one or more voice commands to an application or system that may be configured to play the media program, or in any other manner.

At box 620, a device of the listener requests a state of the media program from a synchronization module. Where the media program is airing live media content, e.g., voices of the creator or any participant, the media program may be deemed to be in a voice state (or a live state, or a live media state). Where the media program is airing pre-recorded media content, e.g., music or other media entities, the media program may be deemed to be in a media state (or a pre-recorded state, or a music state).

At box 630, the device of the listener establishes a one-way connection with a broadcast system. The broadcast system may be configured to transmit audio data to any number of devices to which the broadcast system is connected via one-way connections (e.g., broadcast channels). In parallel, at box 635, the device of the listener establishes a one-way connection with a media system. For example, the media system may be a source of media entities of any type or form, such as a music catalog, repository or streaming service.

At box 640, the synchronization module instructs the device of the listener as to the state of the media program. For example, the synchronization module may instruct the device of the listener that the media program is in a voice state, in which audio data representing voices of the creator or any other participants is being transmitted to devices of the creator or any participants or devices of listeners during the media program. Alternatively, the synchronization module may instruct the device of the listener that the media program is in a pre-recorded media state, in which audio data representing media entities (e.g., songs) of any type or form is being transmitted to such devices during the media program. The synchronization module may also instruct the device of the listener that the media program is in any other state, e.g., a state other than a voice state or a pre-recorded media state, in accordance with implementations of the present disclosure.

At box 645, whether the media program is in a voice state is determined. If the media program is in a voice state, then the process advances to box 650, where the media system pre-buffers one or more media entities selected by the creator on the device of the listener. For example, the media system may transmit all or portions of media entities identified or selected by the creator for potential inclusion in the media program, e.g., prior to a start of the media program, or during the media program, and a source of the media entities may transmit a portion of each of such media entities (e.g., an initial portion of the media entity of any duration), or the media entities in their entirety, to the device of the listener.

In parallel, at box 655, the broadcast system transmits audio data representing the utterances of the creator or any participants to the device of the listener. The broadcast system may receive the audio data from the conference system to which the creator and any participants are connected, e.g., via two-way connections, and transmit the audio data at any sampling rate to the device of the listener and devices of any other listeners.

If the media program is not in the voice state, or after the media system pre-buffers one or more media entities, and after the broadcast system transmits audio data representing utterances of the creator or any participants to the device of the listener, the process advances to box 660, where whether the media program is in a pre-recorded media state is determined.

If the media program is in a pre-recorded media state, then the process advances to box 665, where the synchronization module identifies a seek point of a media entity being played by devices with the media program in the pre-recorded media state, e.g., on devices of the creator, any participants, or listeners to the media program. The seek point of the media entity is a point or a time of the media entity that is then being played with the media program in the pre-recorded media state. For example, if the listener had requested to join the media program as the media entity had just begun, the seek point of the media entity would be or include a beginning of the media entity. Alternatively, if the listener had requested to join the media program one minute after the media program had begun, the seek point of the media entity would include or begin at a one-minute mark in the media entity.

At box 670, whether the media entity being played is sufficiently pre-buffered on the device of the listener that requested to join the media program at box 610 is determined. For example, whether the media entity being played is sufficiently pre-buffered on the device of the listener may be determined based on the seek point. If a sufficiently large portion of the media entity is stored on the device of the listener, such that the media entity may begin playing on the device of the listener with limited or no latency, then the media entity may be deemed sufficiently pre-buffered.

If the media entity being played is not sufficiently pre-buffered on the device of the listener, then the process advances to box 675, where the media system continues to pre-buffer the media entity on the device of the listener.

If the media entity is sufficiently pre-buffered on the device of the listener, or after the media system has sufficiently pre-buffered the media entity to the device of the listener, then the process advances to box 680, where the synchronization module instructs the device of the listener to play the media entity at the seek point. For example, the synchronization module may transmit one or more instructions or commands to the device of the listener identifying the seek point and, optionally, a volume level or any other properties of the media entity.

At box 685, the media system pre-buffers any remaining entities that have been selected by the creator onto the device of the listener. For example, the media system may transmit all or portions of media entities that were identified or selected by the creator for potential inclusion in the media program, excluding the media entity then being played, as well as media entities that have previously been played, which may be unlikely or unable to be played again during the media program.

At box 690, whether the media program is complete is determined. For example, the media program may be scheduled with a finite duration between a start time and an end time, and may be deemed complete at the end time. Alternatively, or additionally, the media program may be terminated at the control or discretion of the creator, e.g., by one or more instructions or commands.

If the media program is not complete, the process returns to box 640, where the synchronization module instructs the device of the listener, and any other devices of any other listeners, as to the state of the media program. Alternatively, if the media program is complete, then the process advances to box 695, where the device of the listener disestablishes connections with the broadcast system, the media system and the synchronization system, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4A and 4B or 6A and 6B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   a device associated with a creator of a media program;
   a conference system in communication with at least the device associated with the creator of the media program via a two-way communications channel;
   a broadcast system, wherein the broadcast system is in communication with at least one device associated with a first listener to the media program via a one-way communication channel; and
   a synchronization system in communication with at least the device associated with the creator and the at least one device associated with the first listener,
   wherein the synchronization system comprises one or more processors and one or more memory components programmed with one or more sets of instructions that, when executed by the one or more processors, cause the synchronization system to at least:
   determine that the media program is in a voice state;
   in response to determining that the media program is in a voice state,
      transmit at least a first instruction to each of the device associated with the creator and the device associated with the first listener, wherein executing the first instruction causes each of the device associated with the creator and the device associated with the first listener to play audio data representing at least a voice of the creator captured by the device associated with the creator;
   determine that the creator has executed at least one interaction associated with playing at least one song, wherein audio data representing at least a first portion of the at least one song is pre-buffered on the device associated with the first listener; and
   in response to determining that the creator has executed the at least one interaction,
      determine that the media program is in a music state; and
      transmit at least a second instruction to each of the device associated with the creator and the device associated with the first listener, wherein executing the second instruction causes each of the device associated with the creator and the device associated with the first listener to play audio data representing the at least one song.

2. The system of claim 1, wherein the one or more sets of instructions, when executed by the one or more processors, further cause the synchronization system to at least:
   receive a request for audio data of the media program from a device associated with a second listener;
   in response to receiving the request,
      identify a second portion of the at least one song played by the device associated with the first listener;
      determine a point or a time of the at least one song based at least in part on the second portion of the at least one song;
      transmit at least a third instruction to the device associated with the second listener, wherein executing the third instruction causes the device associated with the second listener to play audio data representing at the at least one song beginning at the point or the time.

3. The system of claim 1, wherein the at least one interaction is one of:
   an utterance of a voice command captured by the device associated with the creator; or
   an interaction with a portion of a user interface displayed by the device associated with the creator, wherein the portion of the user interface is associated with at least one of playing, pausing, rewinding or fast-forwarding media content of the at least one song.

4. The system of claim 1, wherein the device associated with the first listener is at least a portion of one of:
   an automobile;
   a desktop computer;
   a laptop computer;
   a media player;
   a smartphone;
   a smart speaker;
   a tablet computer;
   a television; or
   a wristwatch.

5. A computer-implemented method comprising:
   identifying a first media entity selected by a creator of a media program;
   causing at least a portion of the first media entity to be stored on at least a computer device associated with a first listener to the media program;
   detecting at least a first interaction by the creator with a computer device associated with the creator at a first time, wherein the first interaction is an utterance of at least one word captured by the computer device associated with the creator;
   determining a first state of the media program at the first time based at least in part on the first interaction, wherein the first state is a live media state;
   generating, by a synchronization system, a first instruction associated with the media program based at least in part on the first state of the media program;
   transmitting, by the synchronization system, at least the first instruction to each of a plurality of computer devices, wherein the plurality of computer devices comprises:
      the computer device associated with the first listener; and
      the computer device associated with the creator;
   causing each of the plurality of computer devices to play first media content of the media program in response to the first instruction, wherein the first media content comprises audio data representing the at least one word;
   detecting at least a second interaction by the creator with the computer device associated with the creator at a second time, wherein the second interaction is associated with at least the first media entity, and wherein the second time follows the first time;
   determining a second state of the media program at the second time based at least in part on the second interaction, wherein the second state is a pre-recorded media state;
   generating, by the synchronization system, a second instruction associated with the media program based at least in part on the second state, wherein the second instruction relates to a playing of second media content of the media program, and wherein the second media content comprises the audio data representing at least the portion of the first media entity;

transmitting, by the synchronization system, at least the second instruction to each of the plurality of computer devices; and causing each of the plurality of computer devices to play the second media content in response to the second instruction.

6. The computer-implemented method of claim 4, further comprising:

causing a display of information regarding a plurality of media entities on an interactive display of the computer device associated with the creator;

receiving a selection of a plurality of media entities via one or more interactions with the interactive display, wherein the plurality of media entities comprises the first media entity, and wherein the first media entity is identified based at least in part on the selection.

7. The computer-implemented method of claim 6, wherein causing at least the portion of the first media entity to be stored on at least the computer device associated with the first listener to the media program comprises:

in response to the selection of the plurality of media entities, causing portions of the plurality of media entities to be transmitted from at least one media source to each of the plurality of computer devices over one or more networks.

8. The computer-implemented method of claim 6, wherein each of the portions of the plurality of media entities comprises an initial portion of one of the media entities of a fixed duration, wherein the portion of the first media entity caused to be stored on at least the computer device associated with the first listener to the media program is an initial program of the first media entity, and wherein the computer-implemented method further comprises:

causing a balance of the first media entity to be transmitted to each of the plurality of computer devices in response to the first instruction, wherein the balance does not include the initial portion of the first media entity.

9. The computer-implemented method of claim 4, further comprising:

establishing a two-way communications channel between the computer device associated with the creator and a conference system, wherein the conference system is configured to receive audio data from any computer device having a two-way communications channel established with the conference system and to transmit the audio data to each of the computer devices having a two-way communications channel established with the conference system; and establishing a one-way communications channel between the computer device associated with the first listener and a broadcast system, wherein the broadcast system is configured to receive audio data from the conference system and to transmit the audio data to each of the computer devices having a one-way communications channel established with the broadcast system.

10. The computer-implemented method of claim 9, wherein the plurality of computer devices comprises a computer device associated with the participant in the media program, and wherein the computer-implemented method further comprises:

establishing a two-way communications channel between the computer device associated with the participant and the conference system; and receiving, by the conference system, audio data from the computer device associated with the participant, wherein the audio data represents the at least one word uttered by the participant captured by the computer device associated with the participant, wherein the first media content comprises the at least one word uttered by the participant.

11. The computer-implemented method of claim 4, wherein causing at least the portion of the first media entity to be stored on at least the computer device associated with the first listener comprises:

causing at least the portion of the first media entity to be stored on computer devices associated with each of a plurality of listeners, wherein the first listener is one of the plurality of listeners, wherein the plurality of computer devices comprises each of the computer devices associated with each of the plurality of listeners.

12. The computer-implemented method of claim 4, wherein the computer device associated with the first listener is at least a portion of one of:

an automobile;
a desktop computer;
a laptop computer;
a media player;
a smartphone;
a smart speaker;
a tablet computer;
a television; or
a wristwatch.

13. The computer-implemented method of claim 4, wherein the first media entity is one of:

an album;
a movie;
a playlist;
a podcast;
a show;
a song; or
a soundtrack.

14. A computer-implemented method comprising:

identifying a first media entity selected by a creator of a media program;

causing at least a portion of the first media entity to be stored on at least a computer device associated with a first listener to the media program;

detecting at least a first interaction by the creator with a computer device associated with the creator at a first time, wherein the first interaction is associated with a playing of at least the first media entity;

determining a first state of the media program at the first time based at least in part on the first interaction, wherein the first state is a pre-recorded media state, generating, by a synchronization system, a first instruction associated with the media program based at least in part on the first state of the media program;

transmitting, by the synchronization system, at least the first instruction to each of a plurality of computer devices, wherein the plurality of computer devices comprises:

the computer device associated with the first listener; and the computer device associated with the creator;

causing each of the plurality of computer devices to play first media content of the media program in response to the first instruction, wherein the first media content comprises audio data representing at least the portion of the first media entity;

detecting at least a second interaction by the creator with the computer device associated with the creator at a second time, wherein the second interaction is an utterance of at least one word captured by the computer device associated with the creator, and wherein the second time follows the first time;

determining a second state of the media program at the second time based at least in part on the second interaction, wherein the second state is a live media state;

generating, by the synchronization system, a second instruction associated with the media program based at least in part on the second state, wherein the second instruction relates to a playing of second media content of the media program, and wherein the second media content comprises audio data representing the at least one word;

transmitting, by the synchronization system, at least the second instruction to each of the plurality of computer devices; and causing each of the plurality of computer devices to play the second media content in response to the second instruction.

15. A computer-implemented method comprising:
identifying a first media entity selected by a creator of a media program;
causing at least a portion of the first media entity to be stored on at least a computer device associated with a first listener to the media program;
detecting at least a first interaction by the creator with a computer device associated with the creator at a first time;
determining a first state of the media program at the first time based at least in part on the first interaction;
generating, by a synchronization system, a first instruction associated with the media program based at least in part on the first state of the media program;
transmitting, by the synchronization system, at least the first instruction to each of a plurality of computer devices, wherein the plurality of computer devices comprises:
the computer device associated with the first listener; and
the computer device associated with the creator; and
causing each of the plurality of computer devices to play first media content of the media program in response to the first instruction, wherein the first media content comprises:
audio data representing at least one word uttered by the creator or a participant in the media program; or
audio data representing at least the portion of the first media entity;
receiving, by the synchronization system, a request to receive media content of the media program from a computer device associated with a second listener to the media program, wherein the request is received at a second time, wherein the computer device associated with the second listener is not one of the plurality of computer devices, and wherein the second time follows the first time;
determining, by the synchronization system, that the media program is in one of the first state or a second state at the second time in response to the request, wherein the one of the first state or the second state is a pre-recorded media state, and wherein each of the plurality of computer devices is playing one of the portion of the first media entity or a portion of a second media entity at the second time;

identifying, by the synchronization system, a point of third media content comprising the one of the portion of the first media entity or the portion of the second media entity;

generating, by the synchronization system, a second instruction associated with the media program based at least in part on the one of the first state or the second state, wherein the second instruction identifies the point of the third media content;

transmitting, by the synchronization system, at least the second instruction to the computer device associated with the second listener; and causing the computer device associated with the second listener to begin playing the third media content at the point in response to the second instruction.

16. The computer-implemented method of claim 15, wherein the first interaction is one of:
an utterance of a voice command captured by the computer device associated with the creator; or
an interaction with a portion of a user interface displayed by the computer device associated with the creator, wherein the portion of the user interface is associated with at least one of playing, pausing, rewinding or fast-forwarding media content.

17. The computer-implemented method of claim 15, further comprising:
determining, by the synchronization system, that the one of the portion of the first media entity or the portion of the second media entity is not stored on the computer device associated with the second listener at the second time; and
in response to determining that the one of the portion of the first media entity or the portion of the second media entity is not stored on the computer device associated with the second listener at the second time,
causing the one of the portion of the first media entity or the portion of the second media entity to be transmitted from at least one media source to the computer device associated with the second listener.

18. A first computer system comprising:
at least one memory component programmed with one or more sets of instructions that, when executed by the first computer system, cause the first computer system to at least:
determine that a media program is in a voice state at a first time, wherein audio data representing at least one voice of at least one of a creator of the media program or a participant in the media program is transmitted to devices associated with each of a plurality of listeners to the media program by way of a conference system and a broadcast system with the media program in the voice state at the first time, wherein the conference system is in communication with a device of the creator and a device of the participant in the media program, and wherein the broadcast system is in communication with the conference system and the devices associated with each of the plurality of listeners;
determine that the creator of the media program has executed a first interaction with the device of the creator at a second time, wherein the second time follows the first time; and
in response to determining that the creator of the media program has executed the first interaction, determine that the media program is in a music state at the second time;

identify a first song associated with the first interaction, wherein at least a portion of the first song is buffered on at least the device of the creator, the device of the participant and the devices associated with each of the listeners; and transmit, to each of the device of the creator, the device of the participant and the devices associated with each of the listeners, an instruction for causing at least the portion of the song to be played.

19. The first computer system of claim 18, wherein the one or more sets of instructions, when executed by the first computer system, further cause the first computer system to at least:

determine that a listener has requested media content of the media program via a device associated with the listener, wherein the listener is not one of the plurality of listeners, and wherein the device associated with the listener is not one of the devices associated with the listeners;

identify a point in the song then being played by at least one of the devices associated with the listeners; and transmit, to at least the device associated with the listener, an instruction for causing at least the portion of the song to be played beginning at the point.

20. The first computer system of claim 19, wherein the one or more sets of instructions, when executed by the first computer system, further cause the first computer system to at least:

in response to identifying the point in the song then being played by the at least one of the devices, determine that at least the portion of the first song including the point is not stored on the device associated with the listener; and cause at least the portion of the first song including the point to be transmitted from a media source having the song stored thereon to the device associated with the listener.

* * * * *